US010102636B2

(12) United States Patent
Murata

(10) Patent No.: US 10,102,636 B2
(45) Date of Patent: Oct. 16, 2018

(54) TARGET MONITORING SYSTEM AND TARGET MONITORING METHOD

(71) Applicant: MITSUBISHI HEAVY INDUSTRIES, LTD., Tokyo (JP)

(72) Inventor: Koichi Murata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/427,450

(22) Filed: Feb. 8, 2017

(65) Prior Publication Data
US 2018/0047174 A1 Feb. 15, 2018

(30) Foreign Application Priority Data

Aug. 10, 2016 (JP) ................. 2016-157103

(51) Int. Cl.
G06K 9/00 (2006.01)
G06T 7/246 (2017.01)
G06T 7/73 (2017.01)
G06T 7/277 (2017.01)

(52) U.S. Cl.
CPC ............. *G06T 7/251* (2017.01); *G06T 7/277* (2017.01); *G06T 7/75* (2017.01); *G06T 2207/10016* (2013.01); *G06T 2207/10044* (2013.01); *G06T 2207/20072* (2013.01); *G06T 2207/20076* (2013.01); *G06T 2207/20081* (2013.01); *G06T 2207/30212* (2013.01); *G06T 2207/30241* (2013.01)

(58) Field of Classification Search
None
See application file for complete search history.

(56) References Cited

U.S. PATENT DOCUMENTS

| 7,957,565 | B1 * | 6/2011 | Sharma | G06K 9/00778 382/103 |
| 2010/0274102 | A1 * | 10/2010 | Teixeira | A61B 5/14552 600/301 |
| 2013/0116960 | A1 * | 5/2013 | Weyn | G01S 5/0252 702/94 |
| 2013/0257626 | A1 * | 10/2013 | Masli | G08B 13/19613 340/691.6 |

FOREIGN PATENT DOCUMENTS

| JP | 3208634 | 9/2001 |
| JP | 5617100 | 11/2014 |

* cited by examiner

Primary Examiner — Vikkram Bali
(74) Attorney, Agent, or Firm — Wenderoth, Lind & Ponack, L.L.P.

(57) ABSTRACT

When the position of a target moving in a monitoring region is intermittently detected, the position of the target is predicted in a higher precision. The prediction precision of the position of the target can be improved by calculating an existence probability distribution of the target and by accumulating the data of the intermittent detection by use of the Bayes' theorem.

11 Claims, 26 Drawing Sheets

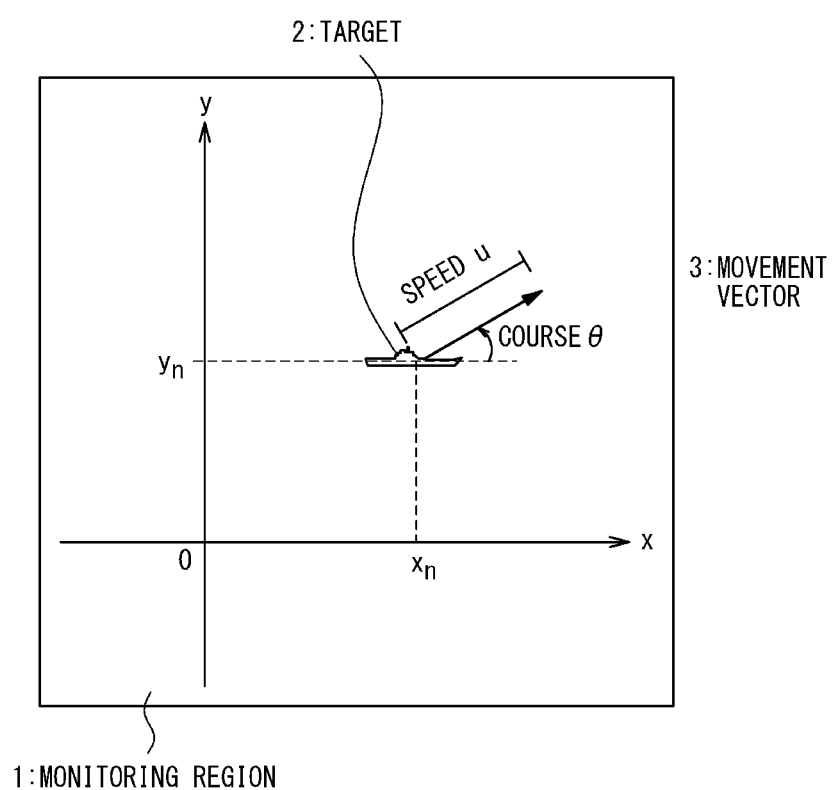

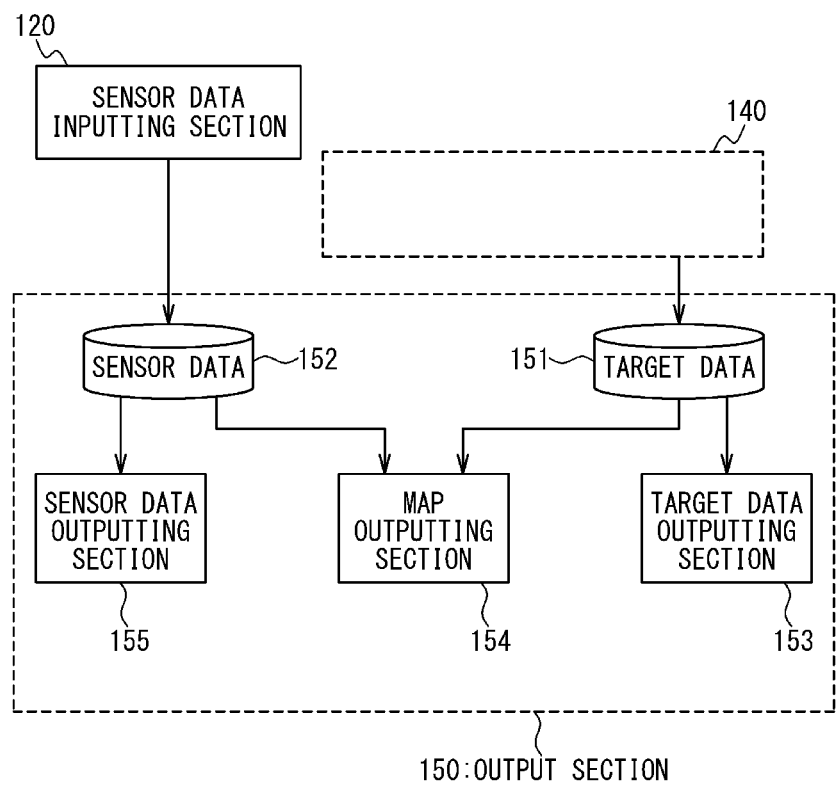

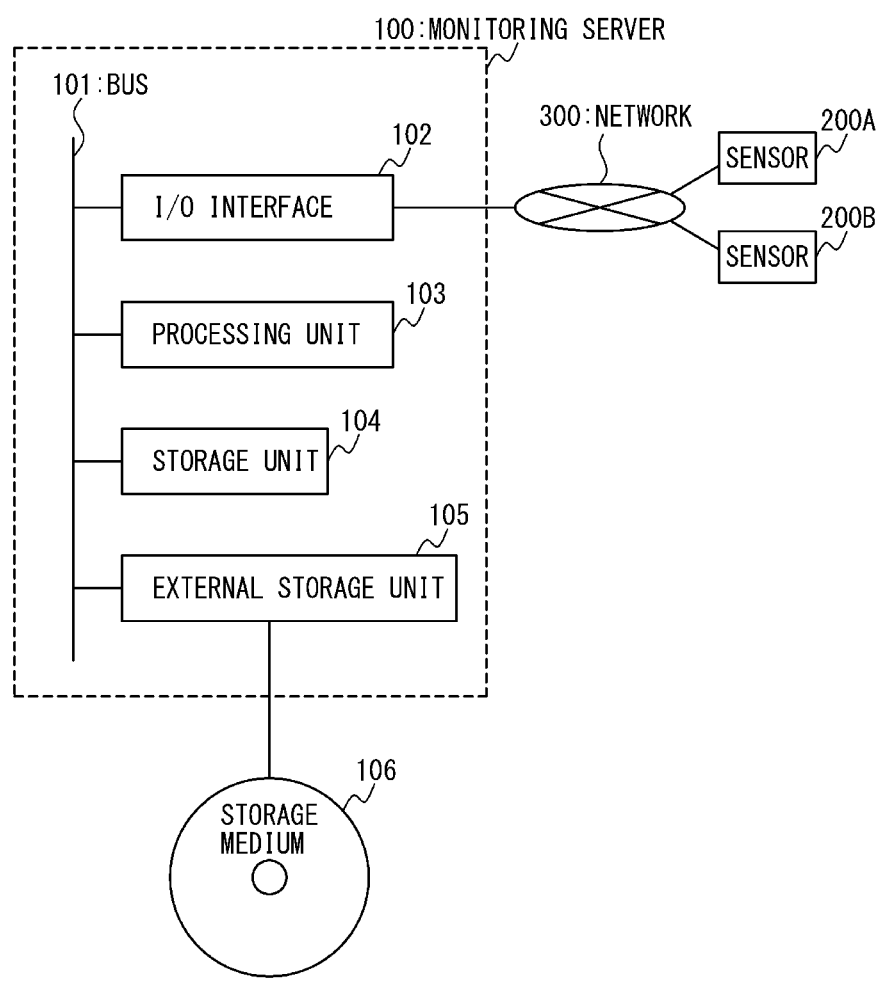

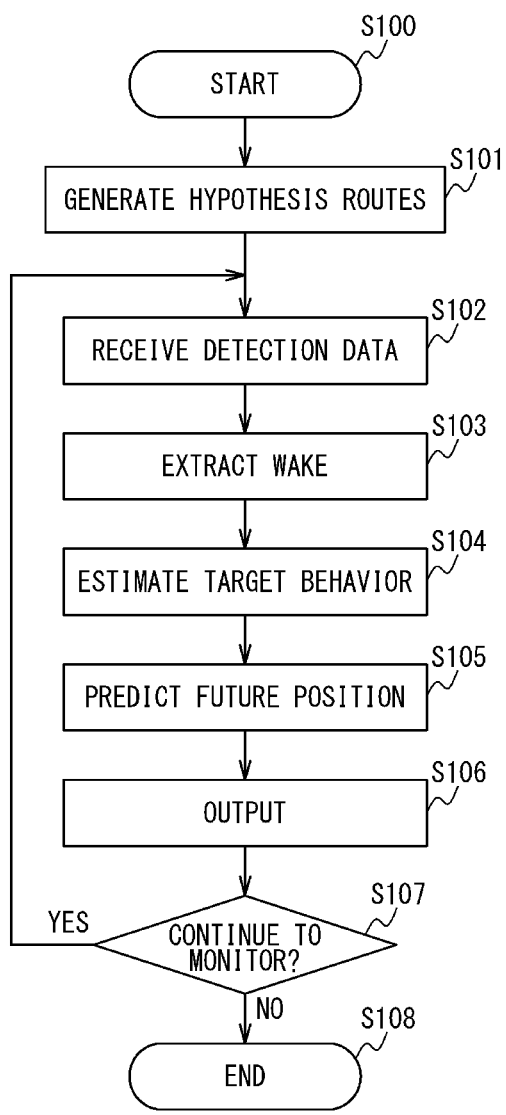

TARGET MONITORING SYSTEM AND TARGET MONITORING METHOD

CROSS-REFERENCE

This application is based on Japanese Patent Application JP 2016-157103 filed on Aug. 10, 2016 and claims a priority based on it. The disclosure thereof is incorporated herein by reference.

TECHNICAL FIELD

The present invention relates to a target monitoring system that is suitable to detect the position of a moving target intermittently.

BACKGROUND ART

There is a case where a wide area needs to be monitored by using a sensor. For example, a search of a rescuee in an area where a disaster has occurred, a rescue support, monitoring of important facilities and so on are considered.

When a target as a monitoring object moves in a monitoring area at a comparatively high speed, radar can become effective as a sensor monitoring the target to detect in a short period corresponding to a moving speed of the target. In such a case, a technique is known that estimates a position of the target by approximating the motion of the target between continuous detections to a uniform linear motion.

Oppositely, when the target moves in a wide monitoring area at a comparatively low speed, the trajectory of the motion of the target becomes complicated so that there is a possibility that it becomes more difficult to predict the position of the target. Moreover, when the monitoring area is wider than the detection range of the radar, an aircraft and an artificial satellite having the radar need to be moved to a location near the target.

In conjunction with the above description, Patent Literature 1 discloses a technique of identity determining means. This identity determining means is characterized by acquiring the following elements to determine the target identity from target data obtained as a target observation result. This identical target determining apparatus includes probability density function expression means, transition probability calculating means, distance calculating means and the identity determining means. At this time, the probability density function expression means shows a spatial existence of the observed target as a probability density function. The transition probability calculating means adjusts to time, the probability density functions of both of a previously observed target and a twice previously observed target, by using a transition probability. The distance calculating means calculates a distance between reference positions of the probability density functions which are adjusted to time. The identity determining means determines the target identity based on the distance between the reference positions.

Also, Patent Literature 2 discloses a sensor integration system. This sensor integration system includes a processor, a storage unit connected with the processor, and an output unit connected with the processor. At this time, the storage unit holds observation data observed by a plurality of sensors. The observation data contain data of a first kind and data of a second kind. The observation data of the first kind contain coordinate values of one or more targets and times when the coordinate values are observed. The observation data of the second kind contain data showing the outwards of one or more targets, times when the data showing the outwards are observed, and coordinate values of the one or more targets. The storage unit further holds data showing a certainty of each coordinate value. The processor estimates movement trajectories of the one or more targets based on the coordinate values of the one or more targets which are contained in the observation data of the first kind, the data showing the outward form of the one or more targets which are contained in the observation data of the second kind, and the observation data of the second kind. The processor predicts the coordinate value of each target at a first time based on the movement trajectory at a time previous to the first time. The processor specifies the most likelihood coordinate value of each target at the first time by calculating an average with weights based on the certainty or a center of gravity, based on the observation data, in which a distance to the predicted coordinate value is within a predetermined value, of the coordinate values contained in the observation data at the first time. The processor corrects the movement trajectory estimated to contain the specified coordinate value. The output unit outputs data showing the movement trajectory.

CITATION LIST

[Patent Literature 1] Japanese Patent No. 3,208,634
[Patent Literature 2] Japanese Patent No. 5,617,100

SUMMARY OF THE INVENTION

The subject matter of the present invention is to predict a position of a target as a monitoring object in a higher precision. Other subject matters and new features will become clear from the description of this Specification and the attached drawings.

According to one embodiment, a target monitoring system includes a storage unit, a processing unit and a display unit. At this time, the storage unit stores a physical model of a target (2), a non-physical model of the target and map data. The physical model shows physical constraints of the target. The non-physical model shows a behavior pattern of the target.

When n is an optional natural number equal to or more than 2, the processing unit executes existence probability distribution calculation processing of calculating an existence probability distribution $P_D(t_n)$ of the target at a time $t_n$ based on data received from an external sensor. The processing unit executes diffusion existence probability distribution calculation processing of calculating a diffusion existence probability distribution $P_M(t_n)$ of the target at the time $t_n$ based on an integration target distribution $P(t_{n-1})$ of the target at a time $t_{n-1}$ previous to the time $t_n$ and the physical model of the target. The processing unit (140) executes reliability calculation processing of calculating a reliability $p_0(t_n)$ of the existence probability distribution $P_D(t_n)$ based on at least one of a kind of the external sensor and environment around the external sensor. The processing unit calculates the integration target distribution $P(t_n)$ of the target at the time $t_n$ based on the following equation:

$$P(t_n)=p_0(t_n)\times P_D(t_n)+(1-p_0(t_n))\times P_M(t_n)$$

The processing unit (140) calculates wake and a predicted course probability of the target based on the integration target distribution $P(t_{n-1})$, an integration target distribution $P(t_n)$ and the non-physical model of the target. A display unit displays a combination of the map data, the wake and the predicted course probability.

According to the one embodiment, the prediction precision of the position of the target can be improved by calculating a target existence probability distribution and accumulating data of the intermittent detection by using the Bayes' theorem.

BRIEF DESCRIPTION OF THE DRAWINGS

FIG. 1A is a plan view showing a condition of a sea surface which is an example of a monitoring region.

FIG. 2B is a functional block diagram showing an example of a remaining part of the overall configuration of the target monitoring system according to the embodiment.

FIG. 2C is a block circuit diagram showing an example of the overall hardware configuration of the target monitoring system according to the embodiment shown in FIG. 2A and FIG. 2B.

FIG. 3 is a flow chart showing an example of the overall operation of the target monitoring system according to the embodiment.

DESCRIPTION OF EMBODIMENTS

Figure 1B:
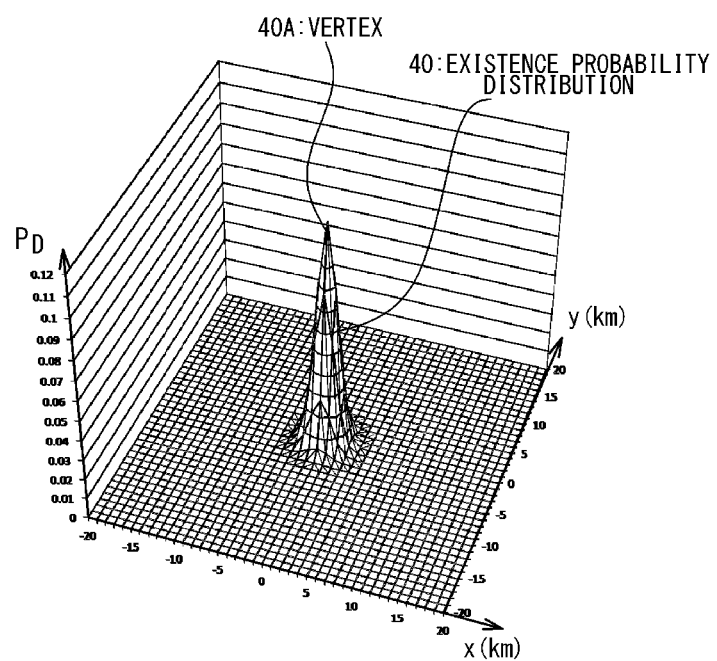
FIG. 1B is a graph showing an example of an existence probability distribution of a target upon a detection in an embodiment.

A target monitoring system and a target monitoring method according to embodiments of the present invention will be described with reference to the attached drawings.

First Embodiment

A case that a target to be monitored is a ship moving on the sea will be described. FIG. 1A is a plan view that showing a condition of a sea surface as an example of a monitoring region. Note that the target as a monitoring object may be a vehicle moving on land and so on.

FIG. 1A shows a sea region as a monitoring region 1 and a ship as a target 2 moving on the sea. The monitoring region 1 is regarded as a plane approximately and an orthogonal coordinate system (O, x, y) is defined on the plane. In this orthogonal coordinate system (O, x, y), the origin O is an optional point and may be a detection point of the target 2 at a detection start time $t_0$. The X-axis passes through the origin O and is directed to an optional direction, and may be parallel to the meridian. The Y-axis is orthogonal to the X-axis at the origin O, and may be parallel to the latitude line.

In the orthogonal coordinate system (O, x, y), the position of the target 2 at an optional time $t_n$ is expressed as a coordinate point $(x_n, y_n)$. Moreover, a movement vector 3 of the target 2 is shown by a course $\theta$ and a moving speed u. Here, the course $\theta$ is an angle between the X-axis and the movement vector 3.

(About Intermittent Detection)

In order to monitor the position and movement of the target 2 like a comparatively small ship to the monitoring region 1 of a wide area like the sea in a significant precision, it is in practice to use a patrol aircraft, an artificial satellite and so on as the sensor. Here, the patrol aircraft as an aircraft cannot continue to stay near the target 2 due to a limitation of a quantity of fuel loadable at once. Therefore, the patrol aircraft must go and return between the target 2 and a base such as an aerodrome. Also, the movement route of the artificial satellite is determined previously so that it is very difficult to change on the way. Therefore, in the target monitoring system according to the present embodiment, the target 2 which moves in the monitoring region 1 is intermittently detected by using one or more sensors.

(Handle Detection Result as Existence Probability Distribution)

It could be considered that an error which cannot be ignored is contained in the detection result of the position of the target 2 by the sensors. Therefore, in the target monitoring system according to the present embodiment, the detection result is handled as not a mere coordinate point of the target 2 but an existence probability distribution in which the error is taken account, in order to improve the detection precision. Here, the existence probability distribution of the target 2 is calculated as a 2-dimensional normal distribution from the following equation (1):

$$F_D((x, y), t_n) = \frac{1}{2\pi \cdot \sigma_m^2} \cdot \exp\left(-\frac{(x-x_n)^2 + (y-y_n)^2}{2\sigma_m^2}\right) \quad \text{[Equation (1)]}$$

where $F_D((x, y), t_n)$ is an existence probability density function of the target 2 on the coordinate point (x, y) at the time $t_n$. $\pi$ is a circumference ratio, and $\sigma_m$ is a variance of an observation error of the detecting sensor. Note that a variance $\sigma_m$ is common to the X-axis and the Y-axis. The coordinate point $(x_n, y_n)$ is a coordinate point showing the position of the target 2 detected by the sensor at the time $t_n$. Also, when the above-mentioned equation (1) is handled in a polar coordinate system, the equation (1) is expressed as the following equation (2):

$$F_D(r, t_n) = \frac{1}{2\pi\sigma_m^2} \exp\left(-\frac{r^2}{2\sigma_m^2}\right) \quad \text{[Equation (2)]}$$

where r is a distance from the center of the 2-dimensional normal distribution.

(Division of Monitoring Region into 2-Dimensional Meshes)

In the present embodiment, when the detection result of the position of the target 2 is to be handled as the existence probability distribution, the monitoring region 1 is divided into the 2-dimensional meshes, to reduce the calculation time, and various types of data are managed for every mesh. FIG. 1C is a plan view showing that the monitoring region 1 is divided into the 2-dimensional meshes and managed.

In an example of FIG. 1C, the X-axis is divided in a unit length Δx and the Y-axis is divided in a unit length Δy. Thus, the monitoring region 1 is divided into the 2-dimensional meshes.

In the present embodiment, the coordinate point $(x_n, y_n)$ showing the position of the target 2 at the time $t_n$ is managed as a mesh $(X_i, Y_j)$ containing the coordinate point. In an example of FIG. 1B, because the following equations are met:

$$4\Delta x \leq x_n < 5\Delta x \text{ and } 3\Delta y \leq y_n < 4\Delta y$$

the coordinate point $(x_n, y_n)$ is managed to be contained in the mesh (5, 4).

Figure 1C:
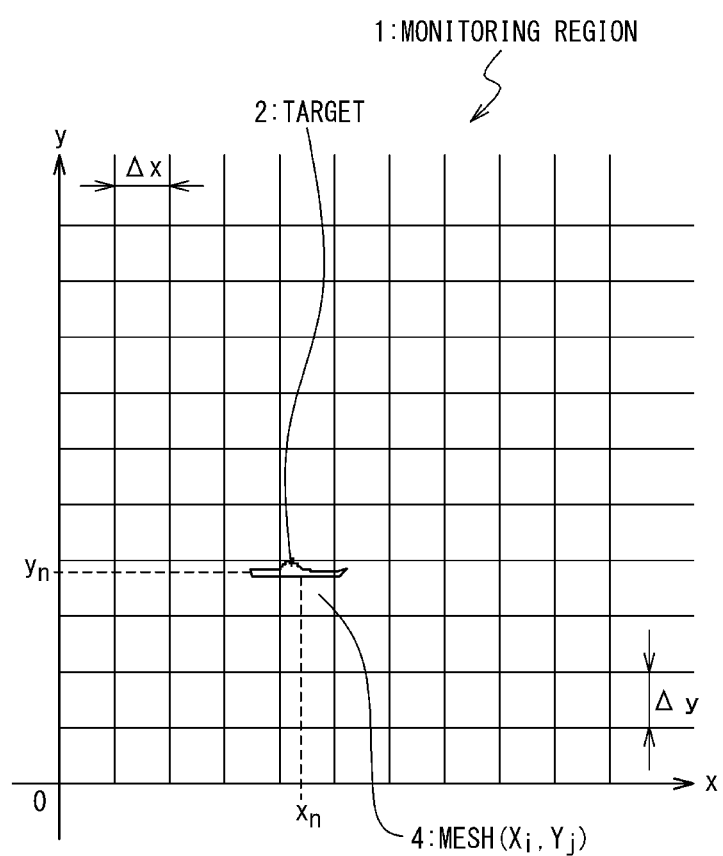
FIG. 1C is a plan view showing the division of the monitoring region into a 2-dimensional meshes.

FIG. 1B is a graph showing an example of the existence probability distribution of the target 2 detected according to the embodiment. The graph of FIG. 1B shows the existence probability distribution 40 subject to the 2-dimensional normal distribution 3-dimensionally as a value of an existence probability in each of the meshes on the XY plane. In FIG. 1B, a vertex 40A where the existence probability is maximum is the detection position of the target 2 and is located on the central part of the graph of the existence probability distribution 40 on the XY plane. Oppositely, the existence probability decreases according to the distance from the detection position of the target 2. The probability that the target 2 exists at an optional mesh $(X_i, Y_j)$ is calculated from a product of the above-mentioned equation (1) and the mesh area as follows:

$$P_D((X_i, Y_j), t_n) = F_D((X_i, Y_j), t_n) \Delta x \Delta y$$

(Bayes' Theorem)

In the present embodiment, Bayes' theorem is applied when the position of the target 2 is intermittently detected so that the predicted course probability is calculated. According to the Bayes' theorem, a conditioned probability can be calculated by using the following identity (3):

$$P(B|A) = \frac{P(A \cap B)}{P(A)} \quad \text{[Equation (3)]}$$

where A shows an optional event, and B shows another event. P(A) shows a probability that the event A occurs. P(A∩B) shows a probability that the event A and the event B both occur. P(B|A) shows a probability that the event B occurs after the event A occurs. At this time, P(A) is referred to as a prior probability, and P(B|A) is referred to as a posterior probability.

The above-mentioned identity showing the Bayes' theorem can be rewritten to the following identity (4) which is called Bayesian inversion formula:

$$P(B|A) = \frac{P(B) \cdot P(A|B)}{\sum P(B) \cdot P(A|B)} \quad \text{[Equation (4)]}$$

This means that the prior probability P(B) of the event B changes into the posterior probability P(B|A) by knowing the occurrence of the event A. In other words, this means that the knowledge in the probability space increases due to the occurrence of the event A as addition data so that the occurrence probability of the event B estimated before the data is added is corrected.

This is met even if the event B is a set of a plurality of events $B_i$. In this case, the above-mentioned Bayesian inversion formula can be rewritten to the following identity (5):

$$P(B_i|A) = \frac{P(B_i) \cdot P(A|B_i)}{\sum P(B_i) \cdot P(A|B_i)} \quad \text{[Equation (5)]}$$

Moreover, in the environment that the occurrence of the event A is repeated, the posterior probability at some time $t_n$ can be regarded as the prior probability at next time $t_{n+1}$. In this case, the occurrence probability of the event B is updated every time the event A occurs, and as the result, the estimation of the posterior probability of a higher precision is expected.

In the present embodiment, the Bayes' theorem is applied as follows. That is, the event A is supposed to be an event that the sensor detects the target 2. The event $B_i$ is supposed to be an event that the target 2 moves along an $i^{th}$ movement route of a plurality of movement routes assumed in the monitoring region 1. Considering in this way, the prior probability $P(B_i)$ which has been estimated as "the probability that the target 2 moves along the $i^{th}$ movement route" before the detection by the sensor is changed to the posterior probability $P(B_i|A)$ because of the occurrence of a detection event A.

Therefore, in the target monitoring system according to the present embodiment, when detection data is acquired, it is stochastically calculated that the target 2 moves along which of the movement routes. Here, $P(A|B_i)$ is a probability that the detection event A occurs on the condition that the target 2 moves along the $i^{th}$ movement route. A calculating method of $P(A|B_i)$ will be described.

First, the probability $P(r)$ that the target 2 whose existence probability distribution is subjected to the 2-dimensional normal distribution exists in the position having a distance r from the center of the distribution is determined by integrating the above-mentioned equation (2) with respect to $rd\theta$, as the following equation (6):

$$P(r) = \int_0^{2\pi} F(r, t_n) rd\theta = \frac{r}{\sigma_m^2} \cdot \exp\left(-\frac{r^2}{2\sigma_m^2}\right) \quad \text{[Equation (6)]}$$

were $\theta$ is an angle of the polar coordinate system.

Figure 1D:
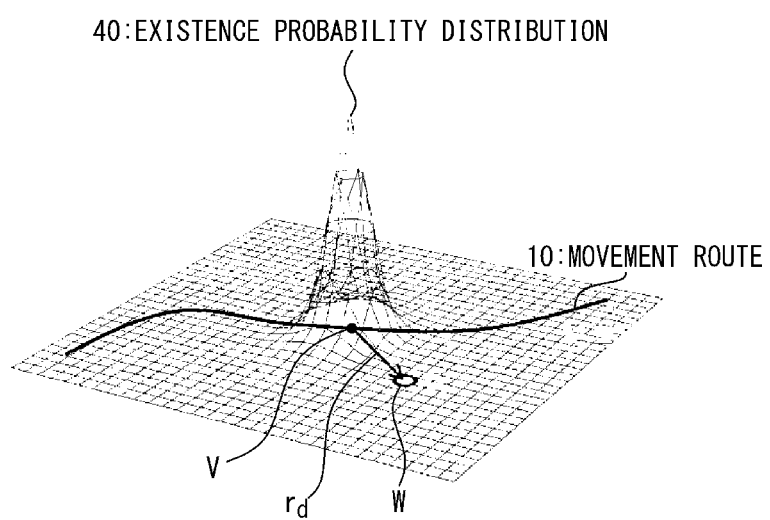
FIG. 1D is a diagram showing an example of a relation of the existence probability distribution of the target, a movement route along which the target moves, and a position of the target detected by a sensor.

FIG. 1D is a diagram showing an example of a relation of the existence probability distribution 40 of the target 2, the $i^{th}$ movement route 10 along which the target 2 moves, and the position W of the target 2 that is detected by sensor. In the example shown in FIG. 1C, the target 2 moves along the $i^{th}$ movement route 10 in the monitoring region 1. A case is considered where when the target 2 is located at a spot V on the $i^{th}$ movement route 10, the sensor carries out a detecting operation and acquires a result that the target 2 is located at a spot W which is apart by the distance $r_d$ from the spot V. In this case, the probability that such detection occurs is a probability that the target 2 exists in the spot W which is apart from the spot V by the distance $r_d$. Therefore, this probability $P(A|B_i)$ can be obtained as the following equation (7):

$$P(A|B_i) = \frac{r_d}{\sigma_m^2} \cdot \exp\left(-\frac{r_d^2}{2\sigma_m^2}\right) \quad \text{[Equation (7)]}$$

Through the above, by applying the prior probability $P(B_i)$ and the above-mentioned equation (7) to the above-mentioned equation (5), the posterior probability $P(B_i|A)$ is calculated. Also, in the environment that the detection is repeated, because the posterior probability at a previous detection time $t_{n-1}$ can be regarded as the prior probability at the current detection time $t_n$, the posterior probability of the present embodiment is calculated as the following equation:

$$P_E(B_i, t_n | A) = \left(\frac{P_E(B_i, t_{n-1}) \cdot P_E(A|B_i, t_n)}{\sum P_E(B_i, t_{n-1}) \cdot P_E(A|B_i, t_n)}\right) \quad \text{[Equation (8)]}$$

where $P_E(B_i, t_n|A)$ is a posterior probability at the detection time $t_n$. $P_E(B_i, t_{n-1})$ is a posterior probability at the previous detection time $t_{n-1}$ and is handled as the prior probability at the current detection time $t_n$.

The procedure which estimates the movement route of the target 2 according to the present embodiment is as follows.

(1) First, when the detection of the target 2 by the sensor has first occurred, a plurality of movement routes are set to show destinations of the target 2, and via points considered from the detection position. Here, it is possible to set a moving speed of the target 2 to each of these movement routes.

(2) Next, before the next detection by the sensor occurs, a prior probability is set to estimate in how high probability the target 2 moves along each movement route.

(3) When the next detection by the sensor has occurred, a posterior probability is calculates by using the above-mentioned equation (5). The posterior probability at this time point is used for the estimation of the movement route.

(4) Since that time, the processing of the above (3) is repeated every time the detection by the sensor occurs.

Figure 2A:
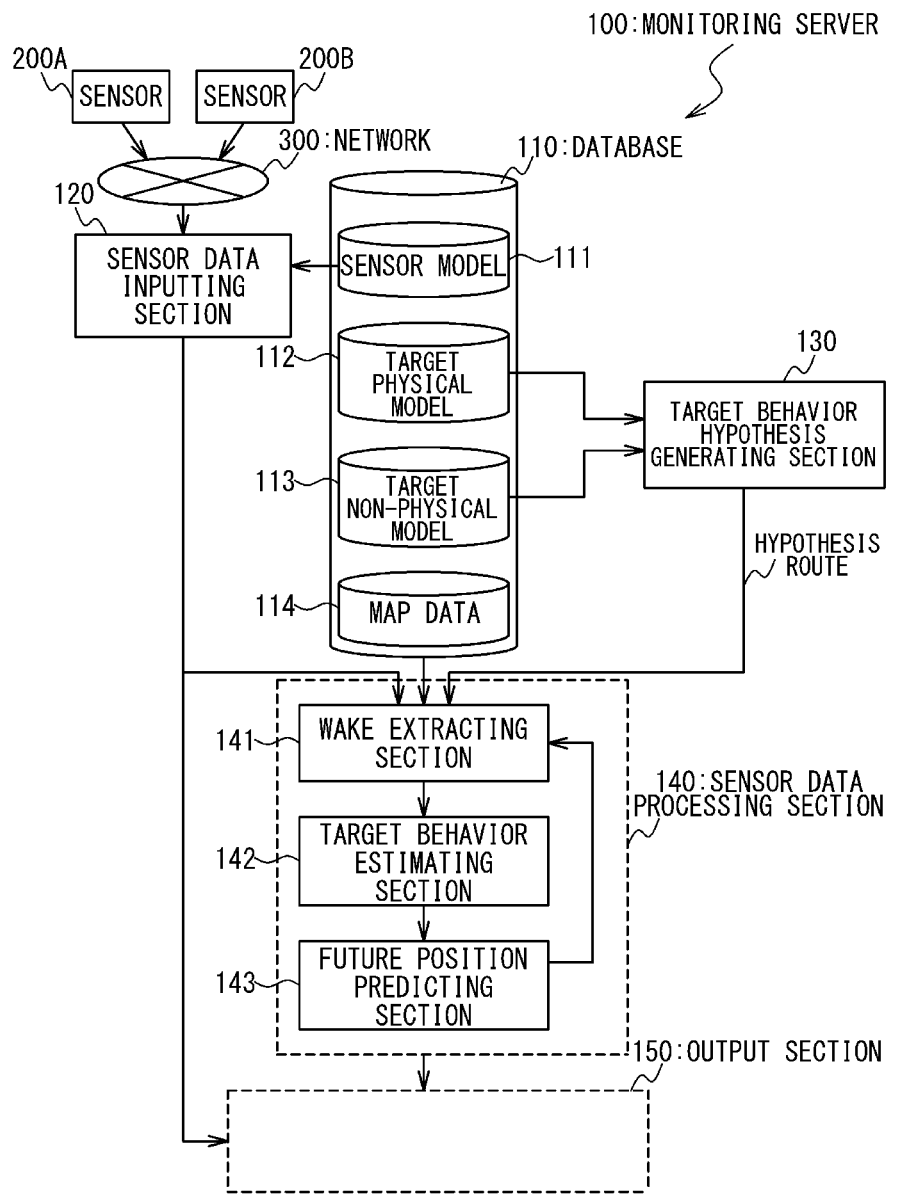
FIG. 2A is a functional block diagram showing an example of a part of the overall configuration of a target monitoring system according to the embodiment.

Based on the above presupposition, the target monitoring system according to the present embodiment will be described. FIG. 2A and FIG. 2B are a functional block diagram showing an example of the overall configuration of the target monitoring system according to the embodiment. Here, of the target monitoring system, a part is shown in FIG. 2A and the remainder is shown in FIG. 2B.

The configuration shown in FIG. 2A will be described. The target monitoring system according to the present embodiment includes a monitoring server 100 and sensors 200A and 200B. Here, the target monitoring system may include a network 300. Oppositely, the target monitoring system may not include the sensors 200A and 200B and may be connected with external sensors. In this case, the monitoring server 100 can be regarded as the target monitoring system.

The monitoring server 100 includes a database 110, a sensor data inputting section 120, a target behavior hypothesis generating section 130, a sensor data processing section 140 and an output section 150. The details of the output section 150 are shown in FIG. 2B.

The database 110 has a sensor model storage area 111, a target physical model storage area 112, a target non-physical model storage area 113 and a map data storage area 114.

The sensor data processing section 140 includes a wake extracting section 141, a target behavior estimating section 142 and a future position predicting section 143.

The output section 150 shown in FIG. 2B includes a target data storage area 151, a sensor data storage area 152, a target data outputting section 153, a map outputting section 154 and a sensor data outputting section 155. Note that a part or a whole of the target data storage area 151 and the sensor data storage area 152 may not be provided in the output section 150 and may be provided in the database 110.

The connection relation of components shown in FIG. 2A and FIG. 2B will be described. The database 110, especially, the sensor model storage area 111 is connected with the sensor data inputting section 120. The outputs of the sensors 200A and 200B are connected with an input of the sensor data inputting section 120 through the network 300. An output of the sensor data inputting section 120 is connected to the sensor data processing section 140, especially, the wake extracting section 141. Moreover, an output of the sensor data inputting section 120 is connected with the sensor data storage area 152, too.

The database 110, especially the target physical model storage area 112 and the target non-physical model storage area 113 are connected to the target behavior hypothesis generating section 130. The target behavior hypothesis generating section 130 is connected to the sensor data processing section 140, especially, the wake extracting section 141.

The database 110, especially, the map data storage area 114 is connected to the sensor data processing section 140, especially, the wake extracting section 141.

The output of the wake extracting section 141 is connected with an input of the target behavior estimating section 142. The output of the target behavior estimating section 142 is connected with an input of the future position predicting section 143. An output of the future position predicting section 143 is connected with an input of the wake extracting section 141.

An output of the sensor data processing section 140 is connected to an input of the output section 150.

In the output section 150, an input of the target data storage area 151 is connected with the output of the sensor data processing section 140. An output of the target data storage area 151 is connected with an input of the target data outputting section 153. An output of the target data storage area 151 is further connected with an input of the map outputting section 154.

An input of the sensor data storage area 152 is connected with an output of the sensor data inputting section 120. An output of the sensor data storage area 152 is connected with an input of the sensor data outputting section 155. An output of the sensor data storage area 152 may be further connected with an input of the map outputting section 154.

The target monitoring system according to the present embodiment can be realized as functions of a general-purpose computer. FIG. 2C is a block circuit diagram showing an example of the overall hardware configuration of the target monitoring system according to the present embodiment shown in FIG. 2A and FIG. 2B.

The components shown in FIG. 2C will be described. The target monitoring system of FIG. 2C includes the monitoring server 100, and sensors 200A and 200B. The network 300 may be contained in the target monitoring system.

The monitoring server 100 of FIG. 2C includes a bus 101, an I/O interface 102, a processing unit 103, a storage unit 104 and an external storage unit 105.

The connection relation of the components of FIG. 2C will be described. The bus 101 is connected with the I/O interface 102, the processing unit 103, the storage unit 104 and the external storage unit 105. The I/O interface 102 is connected with the sensors 200A and 200B through the network 300.

The operations of the components shown in FIG. 2C will be described. The bus 101 mediates the communication which is carried out between the I/O interface 102, the processing unit 103, the storage unit 104 and the external storage unit 105. The I/O interface 102 mediates communication between the monitoring server 100 and an external unit. For example, the I/O interface 102 may realize a function as the sensor data inputting section 120 and communicate between the sensors 200A and 200B through the network 300. Also, the I/O interface 102 realizes a part or all of the functions of the target data outputting section 153, the map outputting section 154 and the sensor data outputting section 155, and output various types of data in an electronic, visual and auditory method.

The external storage unit 105 reads a program, data and so on from an external record medium 106 or writes the program and data in the external record medium 106. The recording medium 106 may be a non-transitory recording medium which cannot carry out the change or deletion of once written data.

The storage unit 104 stores the program, data and so on. The storage unit 104 may realize a part or all of functions of the database 110, the sensor model storage area 111, the target physical model storage area 112, the target non-physical model storage area 113, the map data storage area 114, the target data storage area 151 and the sensor data storage area 152.

The processing unit 103 realizes various functions of the monitoring server 100 by executing the program for processing data. The processing unit 103 may realize a part of or the whole of the functions of the sensor data inputting section 120, the target behavior hypothesis generating section 130, the sensor data processing section 140, the wake extracting section 141, the target behavior estimating section 142, the future position predicting section 143, the output section 150, the target data outputting section 153, the map outputting section 154, and the sensor data outputting section 155.

The operation of the target monitoring system according to the present embodiment shown in FIG. 2A and FIG. 2B, i.e. a target monitoring method according to the present embodiment will be described. FIG. 3 is a flow chart showing an example of the overall operation of the target monitoring system according to the embodiment.

The flow chart shown in FIG. 3 has 9 steps S100 to S108. When executing the flow chart of FIG. 3, first, the target monitoring method is started at the step S100. After the step S100, the step S101 is executed.

Figure 4:
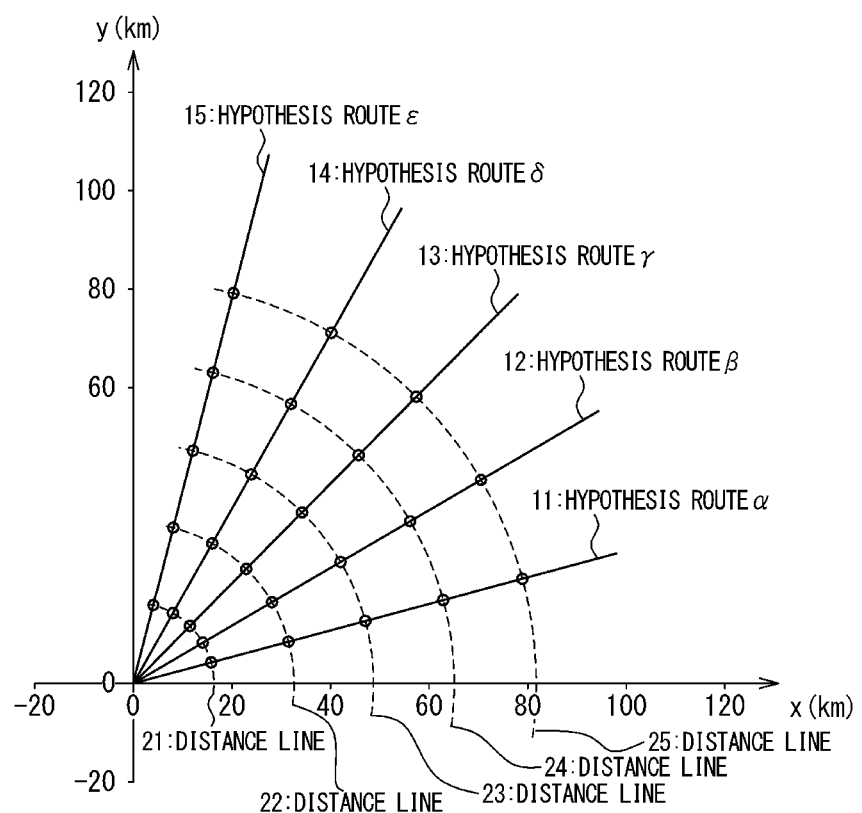
FIG. 4 is a plan view showing an example of hypothesis routes generated by a target behavior hypothesis generating section according to the embodiment.

The target behavior hypothesis generating section 130 forms a plurality of hypothesis courses at the step S101. Here, the hypothesis route will be described. FIG. 4 is a plan view showing an example of the hypothesis routes generated by the target behavior hypothesis generating section according to the embodiment. Note that the processing in which the target behavior hypothesis generating section 130 generates the plurality of hypothesis courses is called hypothesis route calculation processing.

FIG. 4 shows 5 hypothesis routes 11 to 15. These hypothesis routes 11 to 15 are defined on the orthogonal coordinate system (O, x, y) shown in FIG. 1A and FIG. 1B. The position of the target 2 at time $t_0$ at which the monitoring is started in each of the hypothesis routes 11 to 15 is set to the origin O of the orthogonal coordinate system. Also, to make the description easy, each of the hypothesis routes 11 to 15 is set as a straight line. Note that these settings are an example and all types of settings are possible.

Also, FIG. 4 shows 5 distance lines 21 to 25 corresponding to points to which the target 2 is expected to move based on the moving speed u of the target 2 at times $t_1$ to $t_5$. The point which each of the hypothesis routes 11 to 15 and each of the distance lines 21 to 25 intersect shows the position of the target 2 expected at each of the times $t_1$ to $t_5$.

When the above-mentioned hypothesis routes 11 to 15 are generated, the target behavior hypothesis generating section 130 reads the target physical model from the target physical model storage area 112. Moreover, the target behavior hypothesis generating section 130 reads the target non-physical model from the target non-physical model storage area 113. Then, the target behavior hypothesis generating section 130 refers to the target physical model and the target non-physical model to generate the hypothesis routes 11 to 15.

The target physical model is a set of programs and/or various data in which physical constraints to follow when the target 2 moves in the monitoring region 1 are shown in the form computable by the computer. For example, a direction and velocity of tide, a direction and velocity of wind, a depth from the sea surface to the sea bottom, and the existing islands and reefs in the monitoring region 1 are contained in the physical constraints.

The target non-physical model is a set of programs and/or various data shown in the form computable by the computer, behavior patterns as non-physical rules expected to follow when the target 2 moves in the monitoring region 1. For example, the will of the human being who steers a ship as the target 2 is contained in this non-physical law. As a specific instance, the target non-physical model is desirable to contain data showing a harbor for the ship as the target 2 to select as the destination, a safe sea area to be selected as a course, a dangerous sea area to avoid as the course and so on. Also, the results learned by analyzing the past behavior patterns of the target 2 may be utilized.

Data showing the generated hypothesis routes 11 to 15 may be stored in the target behavior hypothesis generating section 130 or the database 110. In any case, it is important that the sensor data processing section 140 of the latter stage can read the hypothesis routes 11 to 15 according to need.

After the step S101, a step S102 is executed.

The sensor data inputting section 120 receives the detection data from the sensors 200A and 200B at the step S102. Either of the sensor 200A or the sensor 200B detects the target 2 and transmits the detection result to the sensor data inputting section 120 through the network 300. It is desirable that the moving speed and moving direction of the target 2 are contained in the data detected and transmitted by the sensor in addition to the detection position of the target 2.

Figure 5:
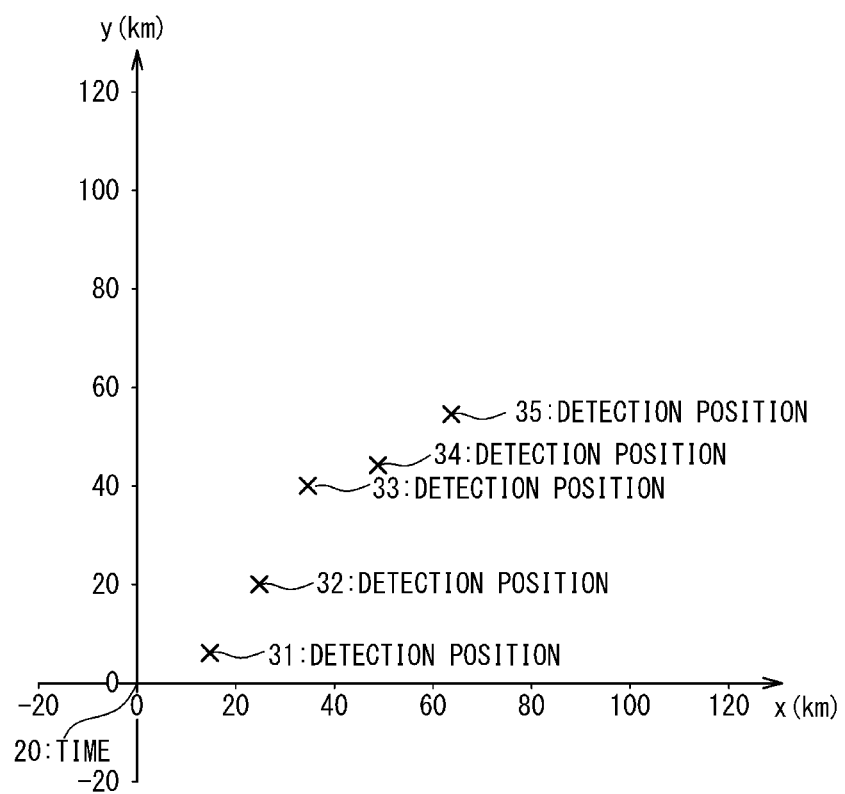
FIG. 5 is a plan view showing an example of detection data received by a sensor data inputting section according to the embodiment.

FIG. 5 is a plan view showing an example of the detection data received by the sensor data inputting section according to the embodiment. FIG. 5A shows 5 detection positions 31 to 35. These positions 31 to 35 show the detection positions of the target 2 detected at each of the times $t_1$ to $t_5$ by any of the sensors 200A and 200B.

Next, the sensor data inputting section 120 receives the data transmitted from the sensor through the network 300. At this time, the sensor data inputting section 120 may read sensor model data according to the characteristics of the sensors 200A and 200B from the sensor model storage area 111 of the database 110. It is desirable to contain at least one of data of a kind of each sensor and data showing environment around each sensor in the sensor model data. A detection precision, a flight range, a time period necessary until a next detection and so on may be further contained in the sensor model data.

After the step S102, a step S103 is executed.

The sensor data processing section 140 estimates an existence probability distribution of the target 2 at the steps S103 to S105.

At the step S103, the wake extracting section 141 extracts a wake of the target 2. At this time, the wake shows a route on which the ship as the target 2 has moved on the sea as the monitoring region 1. Therefore, in case that the monitoring region 1 is not the sea and but land and the target 2 is not a ship but a vehicle, the wake may be read as, for example, "trajectory". The details of step S103 will be described later.

Next, at the step S104, the target behavior estimating section 142 estimates the behavior of the target 2. At this time, the behavior of the target 2 is estimated as a probability that the target 2 moves along each of the hypothesis routes. The details of step S104 will be described later.

Next, at the step S105, the future position predicting section 143 predicts a position of the target 2 in future. At this time, it is desirable the future is a next detection time. The future position of the target 2 means an existence probability distribution of the target 2 at the next detection time, and this is calculated by predicting that the existence probability distribution of the target 2 which is based on the latest detection result diffuses or spreads out until the next detection time. The details of step S105 will be described later.

The details of step S103 will be described. The extraction of the wake is executed by calculating an integration target distribution of the target 2 and plotting the most likelihood existence position every detection. Therefore, the wake extracting section 141 acquires a diffusion existence probability distribution of the target 2 which is based on the previous detection result, from the future position predicting section 143. Also, the wake extracting section 141 acquires the latest detection result of the position of the target 2 detected by the sensors 200A and 200B from the sensor data inputting section 120. Then, the wake extracting section 141 synthesizes the diffusion existence probability distribution which is based on the previous detection result of the target 2 and the existence probability distribution which is based on the latest detection result by an information accumulation means to calculate an integration target distribution. At this time, the wake of the target 2 is determined by referring to the previous integration target distribution $P(t_{n-1})$ at the previous detection time and the current integration target distribution $P(t_n)$ at the current detection time and linking the positions having the highest existence probabilities. The processing of calculating the integration target distribution $P(t_n)$ by the sensor data processing section 140 is called integration target distribution calculation processing. The details of the information accumulation means and diffusion existence probability distribution will be described later. Note that the wake extracting section 141 may acquire map data from the map data storage area 114 of the database 110.

Figure 6A:
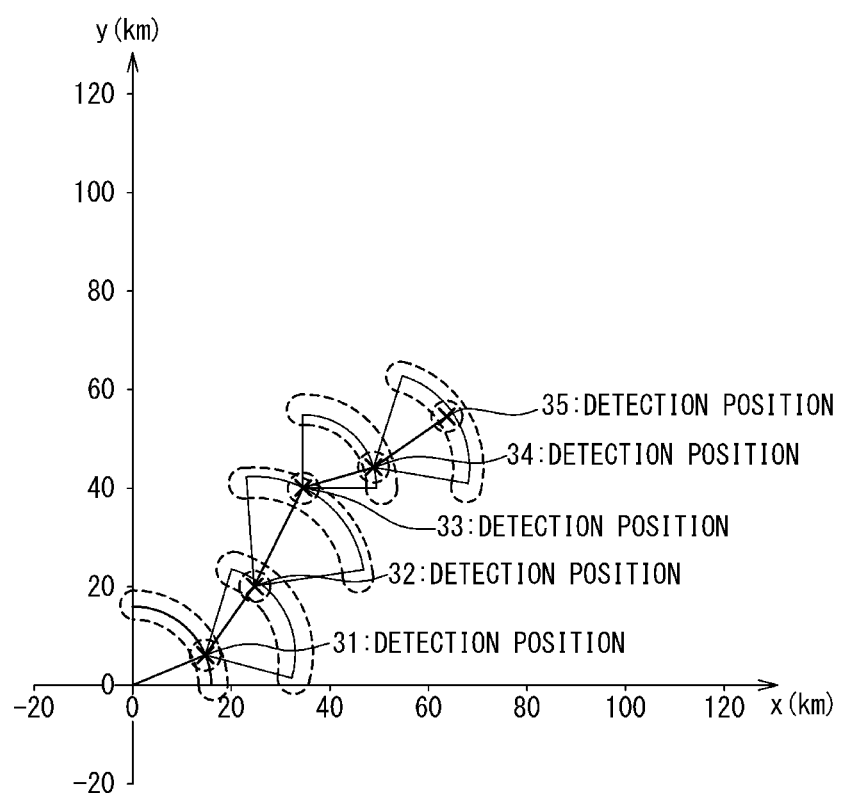
FIG. 6A is a plan view showing an example of a wake extracted by a wake extracting section according to the embodiment.

FIG. 6A is a plan view showing an example of the wake extracted by the wake extracting section 141 according to the embodiment. FIG. 6A shows the outline of the integration target distribution of the target 2 in each detection time, and the wake determined by linking the positions having the highest existence probabilities of the target 2 in the respective distributions, in addition to the plurality of detection positions 31 to 35 shown in FIG. 5.

Figure 6B:
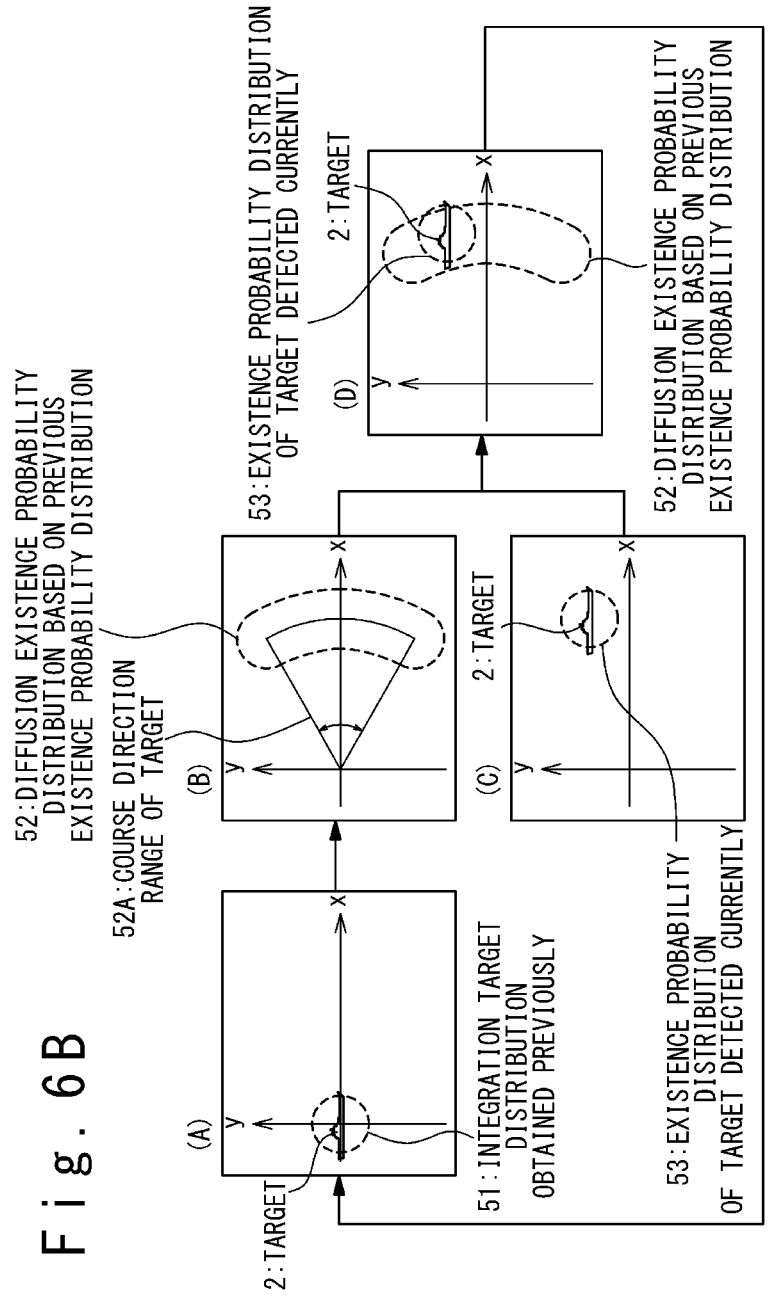
FIG. 6B is diagram showing the principle of a data storing method according to the embodiment.

FIG. 6B is a diagram showing the principle of the information accumulation system according to the embodiment. FIG. 6B contains 4 parts (A) to (D). The part (A) of FIG. 6B shows an example of the integration target distribution 51 of the target 2 obtained from the previous detection result. The part (B) of FIG. 6B shows an example of the diffusion existence probability distribution 52 which is based on the previous existence probability distribution shown in the part (A). At this time, the diffusion existence probability distribution 52 has an arc shape. This arc is defined based on a range of angle θe. The range of angle θe is set as a course direction range of the target 2. The part (C) of FIG. 6B shows an example of the existence probability distribution 53 of the target 2 obtained from the current detection result. The part (D) of FIG. 6B shows to synthesize the diffusion existence probability distribution 52 shown in the part (B) and the existence probability distribution 53 shown in the part (C).

This synthesis can be attained by weighting the diffusion existence probability distribution 52 which is based on the previous existence probability distribution and the current existence probability distribution 53 of the target 2 obtained from the current detection result with predetermined weights and then adding both of the weighted distributions 52 and 53.

For example, the weighting may be a reliability of the detection result of the position of the target 2 by the sensors 200A and 200B. At this time, the reliability is a probability that the detection result is true. It is supposed that the reliability of the existence probability distribution 53 of the target 2 obtained from the current detection result is $p_0$. In this case, the reliability of the diffusion existence probability distribution 52 which is based on the previous existence probability distribution can be set to be a probability $1-p_0$ in which the current detection result is false. By synthesizing the existence probability distribution by using these weights, the existence probability distribution 53 is heavily determined when the current detection result is true, and the diffusion existence probability distribution 52 which is based on the previous existence probability distribution is heavily determined, when the current detection result is false. Thus, by repeating the detection, data with higher reliability is accumulated on the probability distribution.

For example, by the following equation (9), it is possible to synthesize the diffusion existence probability distribution 52 which is based on the previous existence probability distribution and the current existence probability distribution 53 of the target 2 obtained from the current detection result every mesh by using the reliability $p_0$ as the weight:

$$P_n((X_i,Y_j),t_n)=p_0 \cdot P_D((X_i,Y_j),t_n)+(1-p_0) \cdot P_M((X_i,Y_j),t_{n-1}) \quad \text{[Equation (9)]}$$

At this time, $P_D((X_i, Y_j), t_n)$ shows the current existence probability distribution of the target 2 obtained from the current detection result. $P_M((X_i, Y_j), t_n)$ shows a diffusion existence probability distribution, at the current detection time, calculated from the previous detection result. $P((X_i, Y_j), t_n)$ shows a synthesized existence probability distribution, i.e. the current integration target distribution. Considering the reliability $p_0$, this integration target distribution becomes the substantial existence probability distribution of the target 2 at some time $t_n$.

Note that the reliability $p_0$ may be an optional initial value, may be calculated through reliability calculation processing automatically carried out by the sensor data processing section 140, and may be manually inputted by the user. It is desirable that the reliability calculation processing is executed by referring to sensor model data read from the sensor model storage area 111. The reliability calculation processing may be executed every time the detection data is received from the sensors 200A and 200B and the past reliability $p_0$ may be calculated at the optional timing.

After the step S103, the step S104 is executed.

The details of step S104 will be described. The target behavior estimating section 142 estimates the target behavior. The target behavior estimating section 142 calculates the predicted course probability $P_E(B_i, t_n)$ of the target 2 to each of the hypothesis routes by referring to the plurality of hypothesis routes generated previously by the target behavior hypothesis generating section 130 and the data showing the wake extracted by the wake extracting section 141, in order to estimate the behavior of the target 2.

Figure 6C:
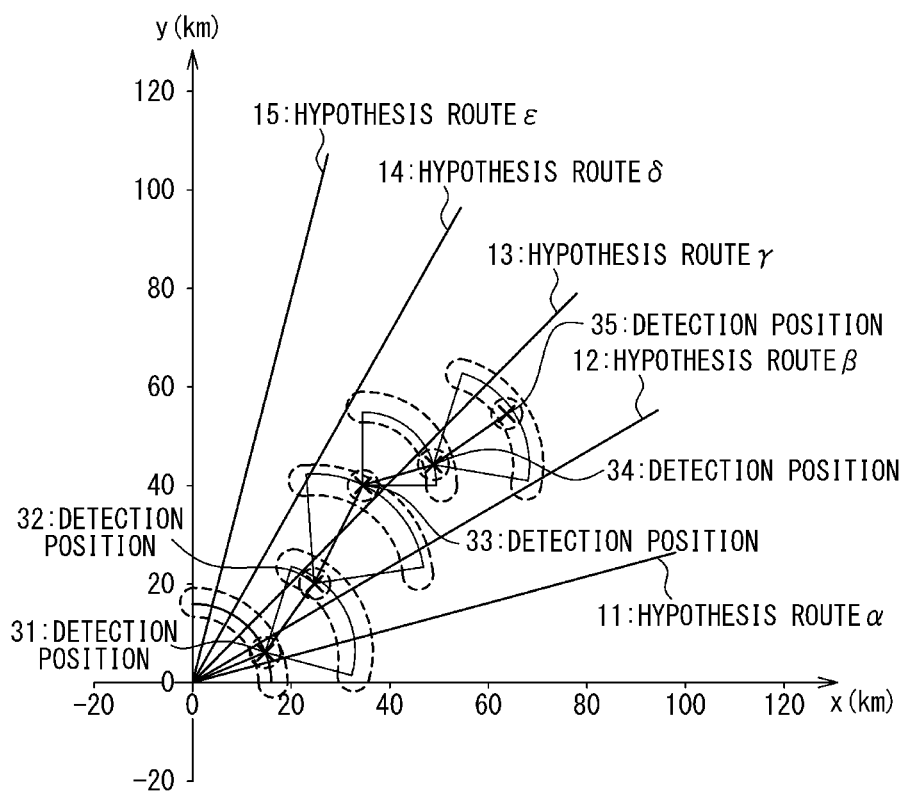
FIG. 6C is a plan view showing an example of the hypothesis routes and the wake to be referred to by a target behavior estimating section according to the embodiment.

FIG. 6C is a plan view showing an example of the hypothesis routes and the wake referred to by the target behavior estimating section according to the embodiment. FIG. 6C is equal to the superposition of FIG. 4 and FIG. 6A. In other words, FIG. 6C shows the plurality of hypothesis routes 11 to 15 shown in FIG. 4 and the wakes which is based on the detection positions 31 to 35 shown in FIG. 6A. The predicted course probability $P_E(B_i, t_n)$ is calculated by using the reliability $p_0$ as the weight and the above-mentioned equation (8) from the following equation (10):

$$P_E(B_i,t_n)=p_0 \cdot P_E(B_i,t_n|A)+(1-p_0) \cdot P_E(B_i,t_{n-1}) \quad \text{[Equation (10)]}$$

Considering reliability $p_0$, this predicted course probability is substantially a posterior probability at the current detection time $t_n$ and is a prior probability at the next time $t_{n+1}$.

Figure 7:
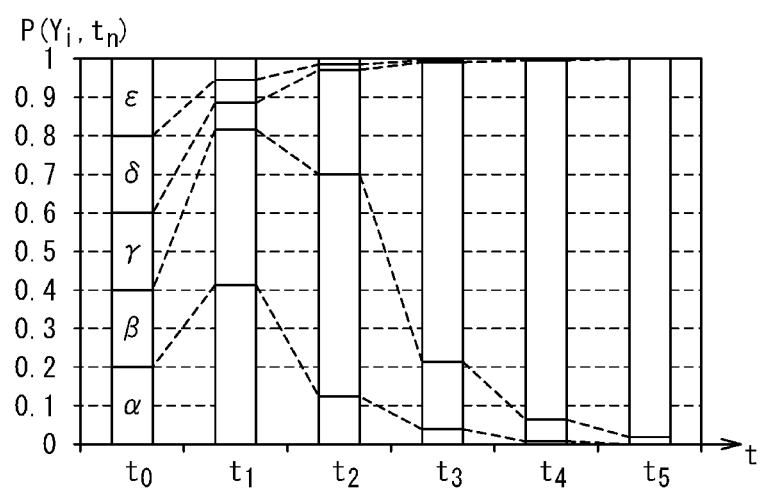
FIG. 7 is a graph showing an example of a predicted course probability predicted by a target behavior estimating section according to the embodiment.

FIG. 7 is a graph showing an example of a change of the predicted course probability predicted by the target behavior estimating section according to the embodiment. The graph of FIG. 7 contains 6 band graphs. In the whole graph of FIG. 7, the horizontal axis shows time and the vertical axis shows the predicted course probability $P_E(B_i, t_n)$ of the target 2 moving along each of the hypothesis routes 11 to 15. These band graphs respectively correspond to the times $t_0$ to $t_5$ in order from the left. Also, each band graph is divided into 5 regions α to ε. These regions α to ε correspond to hypothesis route 11 to 15, respectively. In each band graph, a total of the five predicted course probabilities of the target 2 moving along each of the hypothesis routes 11 to 15 is 1, i.e. 100%. Note that the graph of FIG. 7 corresponds to an example of the hypothesis routes 11 to 15 shown in FIG. 6C and the detection positions 31 to 35.

In the band graph corresponding to the time $t_0$, each of the 5 regions α to ε occupies 0.2 of the whole. This means that at the time $t_0$ before the detection of the target 2 by the sensors 200A and 200B starts, it is considered that the five predicted course probabilities of the target 2 moving along the hypothesis routes 11 to 15 are equivalent.

In the second band graph corresponding to the time $t_1$, the regions γ, δ and ε reduce and the regions α and β increase, compared with the first band graph corresponding to the time $t_0$. This corresponds to the fact that the detection position 31 corresponding to the time $t_1$ is located between the hypothesis routes 11 and 12, as the result that the detection of the target 2 by the sensors 200A and 200B started. In other words, the above corresponds to the fact that the detection position 31 is near the hypothesis routes 11 and 12 and apart from the hypothesis routes 13, 14 and 15.

In the third band graph corresponding to the time $t_2$, the regions α, δ and ε decrease and the regions β and γ increase, compared with the second band graph corresponding to the time $t_1$. At this time, because the detection position 32 corresponding to the time $t_2$ is located between the hypothesis routes 12 and 13, the predicted course probability increases, of the target 2 moving along the hypothesis route 12 and along the hypothesis route 13.

In the fourth to sixth band graphs respectively corresponding to the times $t_3$ to $t_5$, the region γ continues to increase and the regions α, β, δ and ε continue to decrease. In other words, the predicted course probability continues to increase, of the target 2 moving along the hypothesis route 13 over the times $t_3$ to $t_5$.

In an example of FIG. 7, the predicted course probability of the target 2 moving along the hypothesis route 11 or 12 is high in the first half of the monitoring. However, by repeating the detection, it became possible finally to estimate that the predicted course probability is high, of the target 2 moving along the hypothesis route 13.

After the step S104, the step S105 is executed.

The details of step S105 will be described. The future position predicting section 143 predicts the future position of the target 2. As mentioned above, the future position of the target 2 predicted at this time is the existence probability distribution calculated based on the prediction that the existence probability distribution of the target 2 which is based on the current detection result diffuses or spreads out until the next detection time. The existence probability distribution of the target 2 calculated in this way is called the diffusion existence probability distribution $P_M$ of the target 2.

Figure 8A:
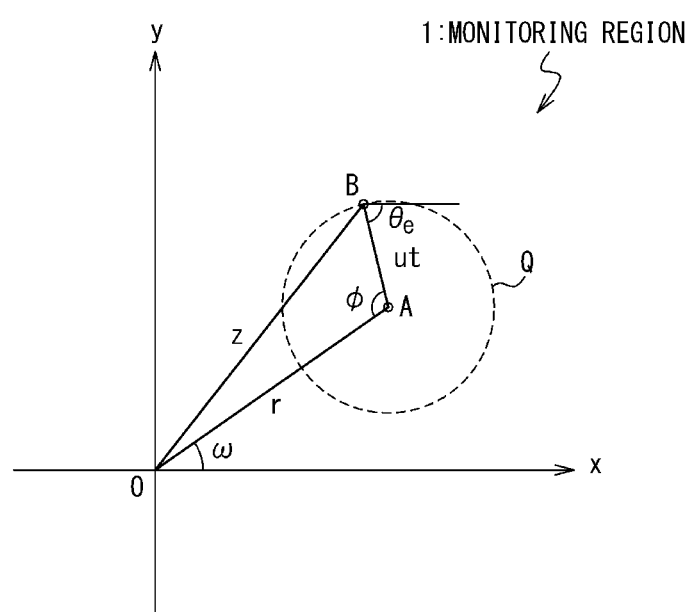
FIG. 8A is a diagram showing a calculating method of a diffusion existence probability distribution according to the embodiment.

FIG. 8A is a diagram showing a calculating method of the diffusion existence probability distribution according to the embodiment. FIG. 8A shows the monitoring region 1. In the monitoring region 1, the origin O and the orthogonal coordinate system (O, x, y) which is defined by the X-axis and the Y are defined. In this orthogonal coordinate system (O, x, y), the origin O is the position where the target 2 has been detected at the detection start time $t_0$. The point A is the detection position of the target 2 at an optional detection time $t_n$. A distance ut denotes a moving distance when the target 2 moves in a moving speed u during a time period t. The time period t is a time period between an optional detection time $t_n$ and a previous detection time $t_{n-1}$. A circle Q has the point A as a center and ut as a radius. That is, it is a set of the points having the possibility that the target 2 has existed at the previous detection time $t_{n-1}$. A point B is an optional point on the circle Q.

It is supposed that the target 2 existed on the point B at previous detection time $t_{n-1}$. In this case, it is shown that the target 2 took a course of the angle θe to move for the point A. Instead of the angle θe having the position of the target 2 as a reference, a relative course is used in order to simplify calculation. The relative course $\phi$ is defined as an angle between the line between the origin O and the point A and the line between the point A and the point B.

At the previous detection time $t_{n-1}$, the existence probability distribution of the target 2 at the point B can be shown by $F(z, t_{n-1})$ from the above-mentioned equation (1). At this time, z shows a distance to the point B from the origin O. A probability that the target 2 located on the point B selects the relative course for the point A is shown by $d\phi/2\pi$, and a probability to select the moving speed u is shown by g(u)du. In this case, the probability that the target 2 located on the point B at the previous detection time $t_{n-1}$ selects the relative course $\phi$ and the moving speed u and is located on the point A after the time period t is shown by $F(z, t_{n-1}) g(u) dud\phi/2\pi$. In this case, if substituting surplus theorem $z^2=r^2+(ut)^2-2rut\cos\phi$, integrating in a range [0 to 2π] with respect to the relative course $\phi$, and integrating in a speed distribution range [$u_1$ to $u_h$] with respect to the moving speed u, the existence probability density function $F_{MA}(r, t)$ of the target 2 after the time period t can be defined from the following equation (11):

$$F_{MA}(r, t) = \int_0^{2\pi} \int_{u_l}^{u_h} \frac{1}{2\pi\sigma_m^2} \exp\left(-\frac{r^2 + (ut)^2 - 2rut\cos\phi}{2\sigma_m^2}\right) g(u) du \frac{d\phi}{2\pi}$$

[Equation (11)]

Here, r shows a distance to the point A from the origin O.

When the coordinates of the point A are supposed as (x, y), $r^2=x^2+y^2$, so that the above-mentioned equation (11) can be rewritten as the following equation (12):

$$F_{MA}((x, y), t) = \int_0^{2\pi} \int_{u_l}^{u_h} \frac{1}{2\pi\sigma_m^2} \exp\left(-\frac{r^2 + y^2 + (ut)^2 - 2\sqrt{x^2+y^2}\,ut\cos\phi}{2\sigma_m^2}\right) g(u) du \frac{d\phi}{2\pi}$$

[Equation (12)]

A probability that the target 2 exists in an optional mesh ($X_i$, $Y_j$) can be calculated as follows from a product of the above-mentioned equation (12) and the mesh area:

$$P_{MA}((X_i, Y_j), t_n) = F_{MA}((X_i, Y_j), t) \Delta x \Delta y$$

Figure 8B:
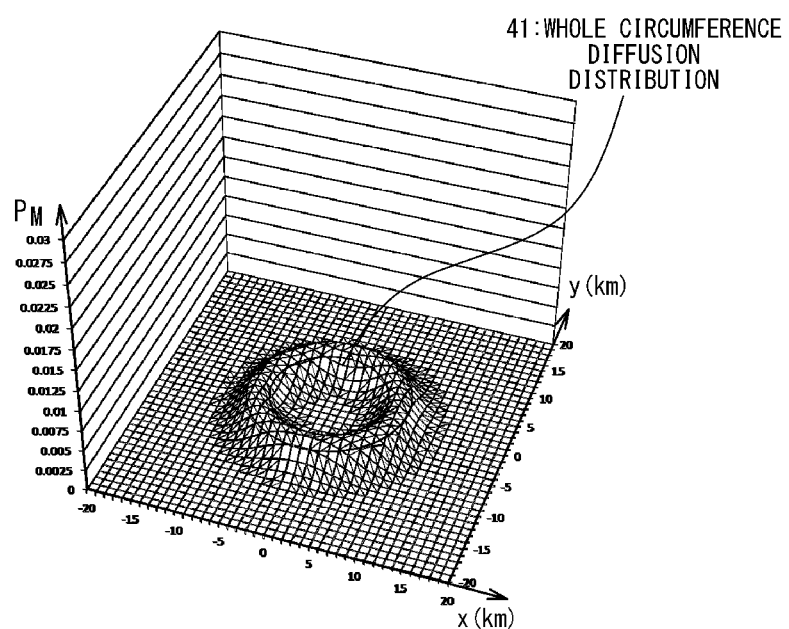
FIG. 8B is a diagram showing an example of a whole circumference diffusion distribution according to the embodiment.

Here, t is a time period to the current detection time $t_n$ from the previous detection time $t_{n-1}$. Because an integration range of the angle $\theta_e$ is [0 to 2π] in the above-mentioned $P_{MA}((X_i, Y_j), t_n)$, this is called a whole circumference diffusion distribution. FIG. 8B is a diagram showing an example of the whole circumference diffusion distribution 41.

The method of calculating the diffusion existence probability distribution $P_M$ has been described when the target 2 determines the angle $\theta_e$ from a uniform distribution in the range [0 to 2π]. However, because the actual target 2 is a ship which moves for a predetermined destination, the following items are considered:
i) The possibility is low that the ship as the target 2 changes the course to a direction opposite to previous direction, as far as there is not a definite intention change such as return to a port.
II) It is physically difficult that the ship as the target 2 which sails on the sea as the monitoring region 1 carries out a substantial course change in a short time.

From the above items, it is possible to specify an integration range of the angle $\theta_e$ in an optional range without fixing the integration range in the whole circumference [0 to 2π]. Accordingly, a method of calculating the diffusion existence probability distribution $P_M$ will be described when the target 2 selects the angle $\theta_e$ from a uniform distribution in an optional range [$\theta_1$ to $\theta_h$].

Supposing that the integration range of the angle $\theta_e$ is [$\theta_1$ to $\theta_h$], the range of the corresponding relative course $\phi$ becomes [($\overline{\omega}-\theta_1$) to ($\overline{\omega}-\theta_h$)]. At this time, $\overline{\omega}$ is an angle between the X-axis and the line between the origin and the point A. Applying the range of this relative course $\phi$ to the above-mentioned equation (12), the following equation (13) is obtained:

$$F_M((x, y), t) = \int_{\omega-\theta_l}^{\omega-\theta_h} \int_{u_l}^{u_h} \frac{1}{2\pi\sigma_m^2}$$

[Equation (13)]

$$\exp\left(-\frac{x^2 + y^2 + (ut)^2 - 2\sqrt{x^2+y^2}\,ut\cos\phi}{2\sigma_m^2}\right) g(u) du \frac{d\phi}{2\pi}$$

Here, $$\omega = \cos^{-1}\left(\frac{x}{\sqrt{x^2+y^2}}\right)$$

[Equation (14)]

A probability that the target 2 exists in an optional mesh ($X_i$, $Y_j$), is calculated as follows by a product of the above-mentioned equation (13) and the mesh area:

$$P_M((X_i, Y_j), t_n) = F_M((X_i, Y_j), t) \Delta x \Delta y$$

Figure 8C:
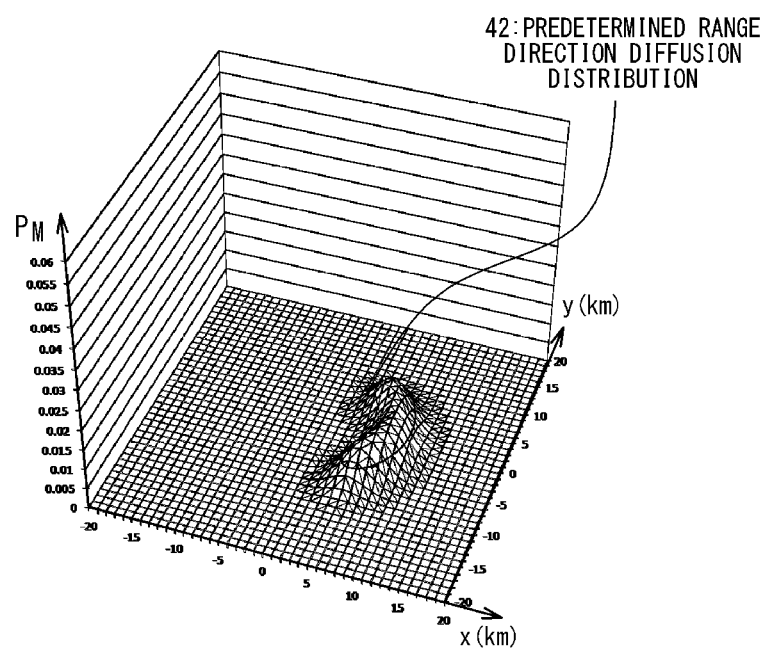
FIG. 8C is a graph showing an example of a predetermined range direction diffusion distribution according to the embodiment.

Here, t is a time period to the current detection time $t_n$ from the previous detection time $t_{n-1}$. In the above-mentioned $P_M((X_i, Y_j), t_n)$, because the integration range of the angle $\theta_e$ is [$\theta_1$ to $\theta_h$], this is called a predetermined range direction diffusion distribution. FIG. 8C is a diagram showing an example of a predetermined range direction diffusion distribution 42. In case of FIG. 8C, the calculation is carried out in a range of [−π/6 to π/6] (radian) around the X-axis. The predetermined range direction diffusion distribution calculated in this way becomes is a non-point symmetry with respect to the center. The processing of calculating the predetermined range direction diffusion distribution by the future position predicting section 143 is called diffusion existence probability distribution calculation processing.

A range of the angle $\theta_e$ is set as a course direction range 52A of the target 2. The range of the angle $\theta_e$ may be an optional initial value, may be automatically set based on the target behavior estimated by the target behavior estimating section 142 or may be manually inputted based on the estimation of the user.

The speed distribution function g(u) will be described. A method of setting the speed distribution function g(u) is mainly divided into the following two.

i) When data according to the moving speed u of the target 2 is contained in the detection data received from the sensors 200A and 200B.

II) When data according to the moving speed u of the target 2 is not contained in the detection data received from the sensors 200A and 200B When the speed data is contained, the speed distribution function g(u) can be shown as follows by using the Dirac's delta function $\delta(x)$:

$$g(u)=\delta(u-u_0)$$

At this time, $u_0$ is the speed of the target 2 contained in the detection data. Also, the delta function $\delta(x)$ is defined as $\delta(x)=0$ and [Equation (15)]

$$\int_{-\infty}^{\infty}\delta(x)dx=1$$

at the time of $x \neq 0$.

When the speed data is not contained, for example, it is supposed that the target 2 selects a speed from the uniform distribution between the lowest speed $u_1$ to the highest speed $u_h$. In this case, the speed distribution function g(u) can be shown as follows.

in case of $u_1 \leq u \leq u_h$,
$g(u)=1/(u_h-u_1)$
in other cases,
$g(u)=0$

From the above, the method of calculating the existence probability distribution of the target 2 by using the information accumulation menas is built up. The predetermined range direction diffusion distribution 42 calculated every mesh is referred to as a diffusion existence probability distribution at the step S103 at the next detection time. Therefore, the predetermined range direction diffusion distribution 42 calculated at the step S105 may be stored in the future position predicting section 143 until it is referred to at the step S103 of the next detection time, may be stored in the storage unit (not shown) of the sensor data processing section 140, or may be stored in the database 110. More desirably, the calculated predetermined range direction diffusion distribution 42 is stored in either of the storage units until the monitoring completes.

After the step S105, the step S106 is executed.

At the step S106, the output section 150, especially, the target data outputting section 153 outputs target data. The target behavior estimated at the step S104, i.e. the predicted course probability corresponding to each of the hypothesis routes 11 to 15 is contained in the outputted target data. Note that the data of wake extracted at the step S103, i.e. the synthesized existence probability may be contained in the outputted target data. Also, the future position, i.e. the diffusion existence probability distribution predicted at the step S105 may be contained in the outputted target data.

Note that it is desirable that the outputted target data is stored in the target data storage area 151 before being outputted by the target data outputting section 153.

The sensor data outputting section 155 of the output section 150 may output the sensor data at the step S106. The outputted sensor data contains the detection data received by the sensor data inputting section 120.

Note that it is desirable the outputted sensor data is stored in the sensor data storage area 152 before being outputted by the sensor data outputting section 155.

At the step S106, the map outputting section 154 of the output section 150 may further output map data. The outputted map data contains synthesis data of geographical data in the monitoring region 1, an extracted wake, and the predicted course probability corresponding to each of the hypothesis routes 11 to 15.

The output section 150 may output various data visibly by a display and so on, may output to an external electronic equipment electronically, and may output with a speaker and so on auditorily.

After the step S106, the step S107 is executed.

Whether the sensor data processing section 140 continues the monitoring is determined at the step S107. When continuing the monitoring as a result of the determination (YES), the step S102 is executed. Oppositely, when not continuing the monitoring (NO), the step S108 is executed and the target monitoring method according to the present embodiment ends.

As described above, according to the target monitoring system and the target monitoring method of the present embodiment, when the position of the target 2 moving in the monitoring region 1 which has a comparatively vast area is intermittently detected by using the sensors having a comparatively narrow detection range, the prediction precision is improved by applying the Bayes' theorem, and it is possible to improve the detection precision by using the information accumulation means. It becomes possible to consider the non-physical law for the target 2 expected to follow, in addition to the physical constraints to follow when the target 2 moves, by using the hypothesis routes generated before the detection, and further improvement of the detection precision is expected.

Second Embodiment

In the first embodiment, the reliability $p_0$ of the detection has been described as the step S103 shown in the flow chart of FIG. 3. In the present embodiment, a handling method will be described when the reliability $p_0$ of the detection is changed in the subsequent detections as a modification example of the first embodiment.

There is a case where it is proved during repeating the detection that the detection data received in the past is false. The false detection would be generated when an object different from the target 2 is erroneously regarded as the target. In such a case, the reliability of the detection data having been determined as the false detection is corrected to "0" and moreover the integration target distribution P is corrected, and then a predicted course probability since that time is recalculated. To make the recalculation possible, it is desirable that all the detection data are stored in the database 110. Note that the corrected integration target distribution P is called a corrected integration target distribution $P_C$.

Figure 9:
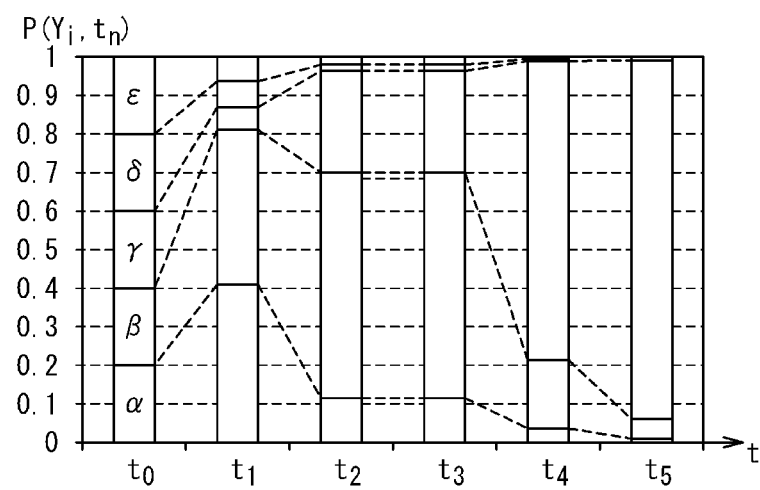
FIG. 9 is a graph showing an example of recalculation of the predicted course probability according to the embodiment.

FIG. 9 is a graph showing an example of the recalculation of the predicted course probability according to the embodiment. In an example of FIG. 9, a case is assumed that it is determined that the detection data at the detection time $t_3$ is false. In other words, FIG. 9 shows band graphs when the course probability at the detection time $t_3$ and the subsequent times is recalculated after the reliability of the detection data at the detection time $t_3$ is corrected to "0". As a result, the band graph corresponding to the detection time $t_3$ is the same as the band graph at the detection time $t_2$. Because the detection result after that is the same, the course probability approaches the example shown in FIG. 7 finally. However, it could be understood that a probability that the target 2 passes through the hypothesis route 11 or 12 in the example of FIG. 9 is higher than in the example of FIG. 7.

Because the other configuration and operations in the present embodiment are same as those of the first embodiment, the further detailed explanation is omitted.

Third Embodiment

In the first embodiment, it has been described that the hypothesis courses 11 to 15 are previously generated in order to apply the Bayes' theorem and then the detection of the target 2 is carried out. However, actually, the necessity that the hypothesis routes 11 to 15 are corrected occurs while repeating the detection. In the present embodiment, as a modification example of the first embodiment, a method of changing the hypothesis routes after the the start of detection and applying a Bayes' theorem will be described.

Figure 10A:
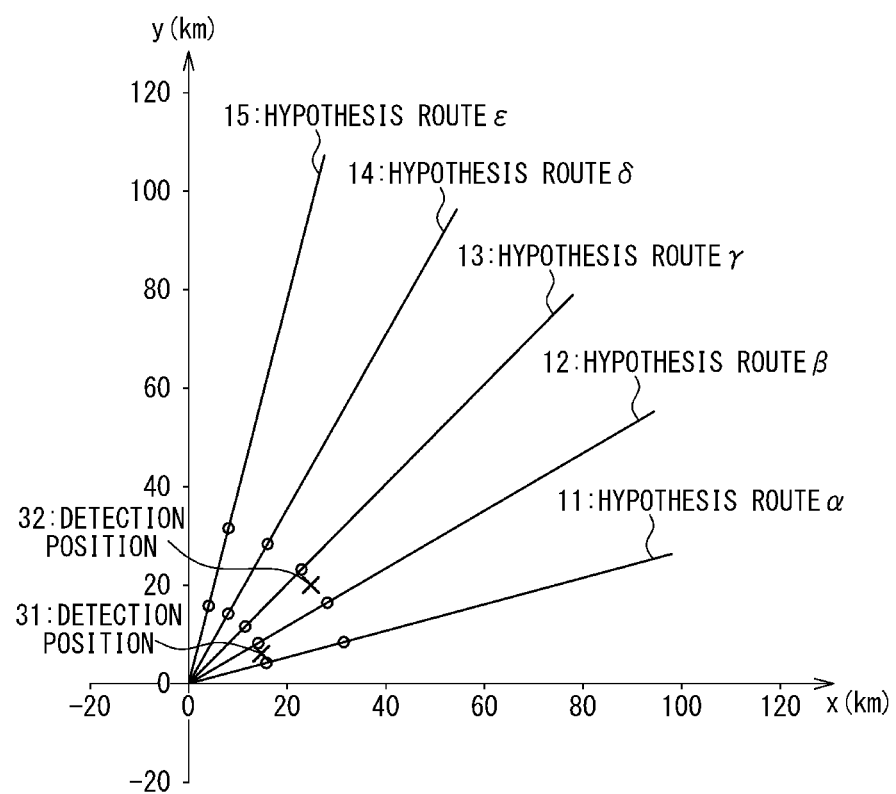
FIG. 10A is a diagram showing a condition of the hypothesis routes immediately before correction of the hypothesis routes by the target behavior hypothesis generating section according to the embodiment after the start of detection.

FIG. 10A is a diagram when the target behavior hypothesis generating section according to the embodiment shows a state immediately before the hypothesis routes are corrected after the start of detection. In an example of FIG. 10A, the detection is starts after the hypothesis courses 11 to 15 are formed, like the case of FIG. 6A, and the detection positions 31 and 32 corresponding to the detection times $t_1$ and $t_2$ are respectively acquired. Referring to FIG. 7, at the detection time $t_2$, the hypothesis routes 12 and 13 are the highest in the predicted course probability. Therefore, in order to improve the detection precision, predicting that the destination of the target 2 is on an extended line of the hypothesis route 12 or 13, the correction can be considered so that the density of the hypothesis route in this direction is increased.

Figure 10B:
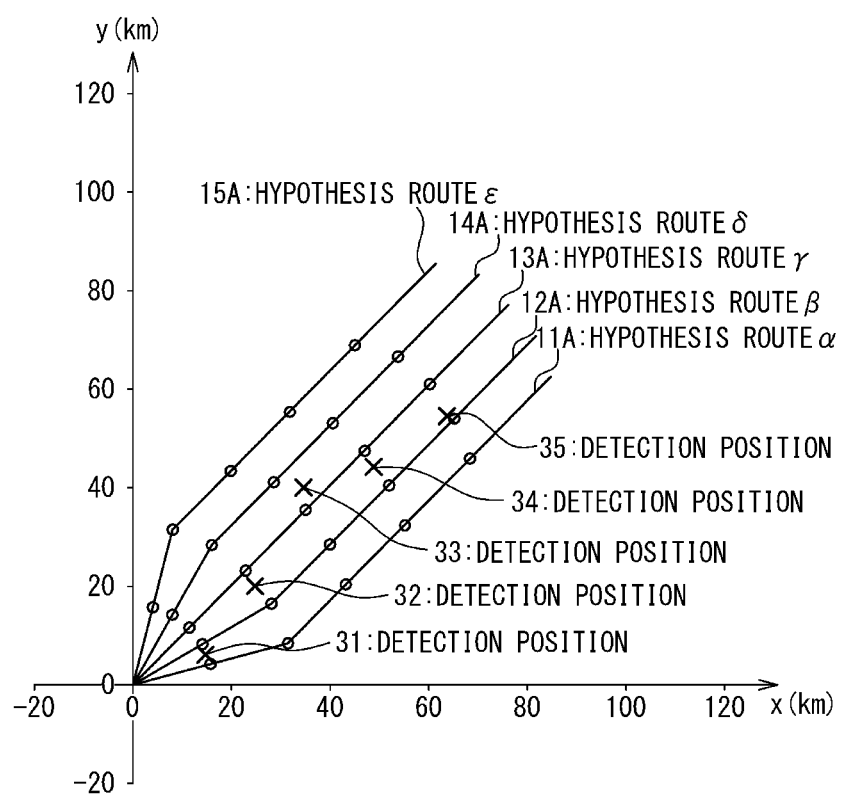
FIG. 10B is another diagram showing a method of correcting of the hypothesis routes by the target behavior hypothesis generating section according to the embodiment after the start of detection.

FIG. 10B is another diagram showing a method of correcting the hypothesis routes by the target behavior hypothesis generating section according to the embodiment after the start of detection. In an example of FIG. 10B, the hypothesis routes 11 to 15 are corrected to the hypothesis routes 11A to 15A at the detection time $t_2$. As an example, a part corresponding to the time $t_3$ and the subsequent times of the corrected hypothesis routes 11A to 15A is parallel to the hypothesis route 13 before the correction but this correction does not limit the present embodiments.

Here, a part corresponding to the detection times $t_0$ to $t_2$ of the corrected hypothesis routes 11A to 15A is the same as the hypothesis routes 11 to 15 before the correction. This is the limitation which is necessary to apply the Bayes' theorem to the detection data before the detection time $t_2$ even if the correction of the hypothesis routes is carried out. Therefore, the number of degrees of freedom to correct the hypothesis routes is made small, but the knowledge of the predicted course probability obtained before the correction can continue to be utilized.

Figure 10C:
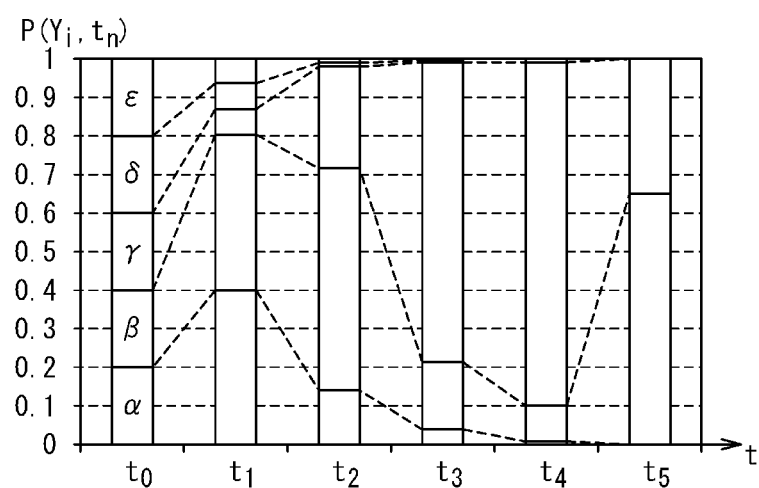
FIG. 10C is a graph showing the predicted course probability when using the corrected hypothesis routes shown in FIG. 10B.

FIG. 10C is a graph showing the predicted course probability when using the corrected hypothesis routes 11A to 15A shown in FIG. 10B. The predicted course probability to the detection time $t_2$ shown in FIG. 10C in case of the corrected hypothesis routes is the same as that of FIG. 7 in case of the non-corrected hypothesis routes. The predicted course probability at the detection time $t_3$ and the subsequent times after the correcting of the hypothesis routes shown in FIG. 10C is different from that of FIG. 7. Because a part corresponding to the detection time $t_3$ and the subsequent times of the hypothesis routes 11A to 15A has a high density between the hypothesis routes 11A to 15A, it is consequently expected that the precision of the predicted course probability is improved.

The determination of whether the hypothesis routes should be corrected after the start of detection may be carried out manually by the user of the monitoring server 100 or automatically by the sensor data processing section 140. This determination may be carried out immediately after the determination of whether the target 2 should continue to be monitored at the step S107 of the flow chart shown in FIG. 3 in the first embodiment.

Figure 10D:
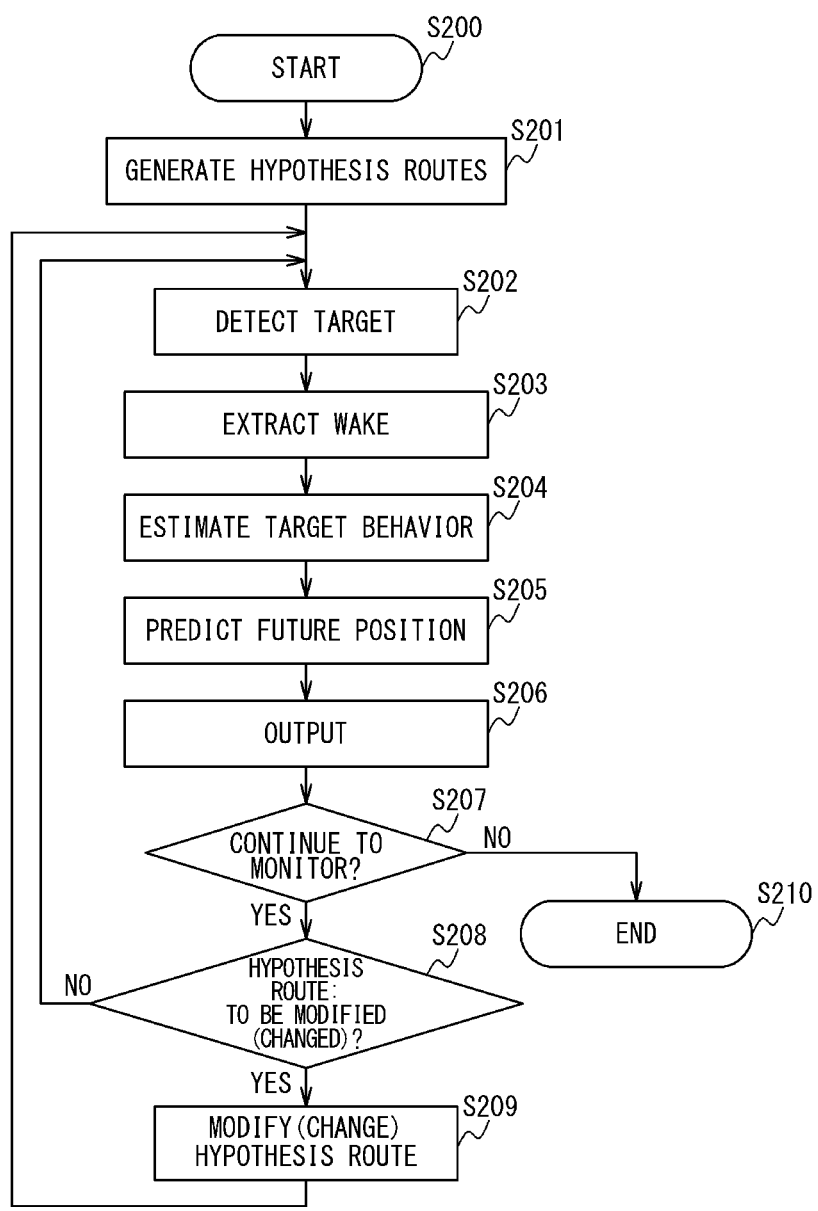
FIG. 10D is a flow chart showing an example of the overall operation of the target monitoring system according to the embodiment.

The operation of the target monitoring system according to the present embodiment, i.e. the target monitoring method according to the present embodiment will be described. FIG. 10D is a flow chart showing an example of the overall operation of the target monitoring system according to the present embodiment. The flow chart of FIG. 10D includes 11 steps S200 to S210. Because the steps S200 to S207 are respectively same as the steps S100 to S107 shown in FIG. 3, further detailed explanation is omitted.

When the monitoring should continue at the step S207 (YES), the next step S208 is executed. Oppositely, when should not be continued (NO), the step S210 is executed.

At the step 208, whether the correction of the hypothesis routes should be carried out is determined. When the correction is carried out (YES), the step S209 is executed. Oppositely, when the correction is not carried out (NO), the step S202 is executed.

The correction of the hypothesis routes is carried out at the step 209. After the step S209, the step S202 is executed.

The operation of the target monitoring system according to the present embodiment ends at the step S210.

Because it is same as the case of the first embodiment about the other configuration and the operation of the present embodiment, further detailed explanation is omitted.

Fourth Embodiment

In the third embodiment, in order to utilize the knowledge of the predicted course probability before the hypothesis routes are corrected even after the hypothesis routes are corrected, the predicted course probability before the detection time $t_2$ is not corrected. However, actually, there is a case that the necessity of the more drastic course correction occurs even if the knowledge before the correction is abandoned. In the present embodiment, another method of changing the hypothesis routes after the start of detection will be described as a modification example of the first embodiment or the third embodiment.

Figure 11A:
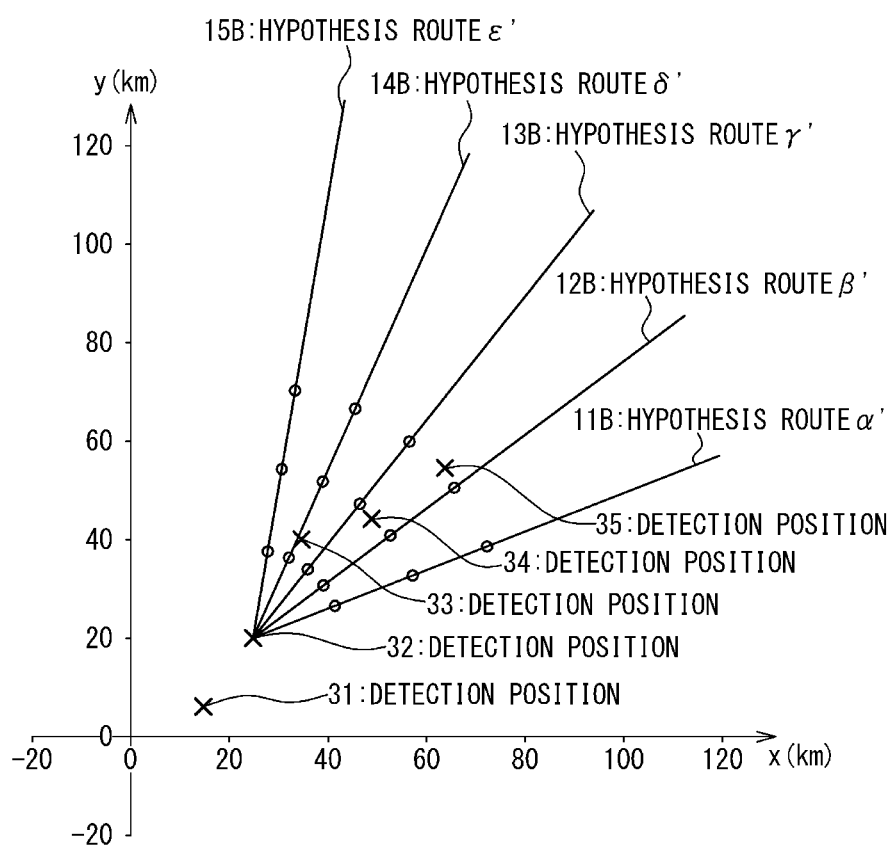
FIG. 11A is a diagram showing another method of correcting the hypothesis routes by the target behavior hypothesis generating section according to the embodiment after the start of detection.

An example shown in FIG. 7 of the first embodiment is used in this embodiment, like the third embodiment. That is, the state immediately before the correction of the hypothesis routes to the detection time $t_2$ is the same as the state shown in FIG. 10A in the third embodiment. However, the state after the correction of the hypothesis routes at the detection time $t_2$ and the subsequent times is different from the state in the first embodiment or the third embodiment. FIG. 11A is a diagram showing another method of correcting the hypothesis routes by the target behavior hypothesis generating section after the start of detection.

As shown in FIG. 11A, the detection positions 31 to 35 respectively corresponding to the detection times $t_1$ to $t_5$ are the same as in case of FIG. 7 of the first embodiment and FIG. 10A of the third embodiment. On the other hand, the corrected hypothesis routes 11B to 15B shown in FIG. 11A do not inherit the hypothesis routes 11 to 15 before the correction even partially. In this way, the present embodiment gives high degrees of freedom for the correction of the hypothesis routes after the start of detection. However, the knowledge according to the existence probability distribution of the target 2 obtained by the detection time $t_2$ cannot be utilized after the correction of the hypothesis routes. Also, any of the corrected hypothesis routes 11B to 15B starts from the detection position 32 corresponding to the time $t_2$.

In other words, the correction of the hypothesis routes after the start of detection according to the present embodiment is identical to switching of the monitoring with the correction time as the start time.

Figure 11B:
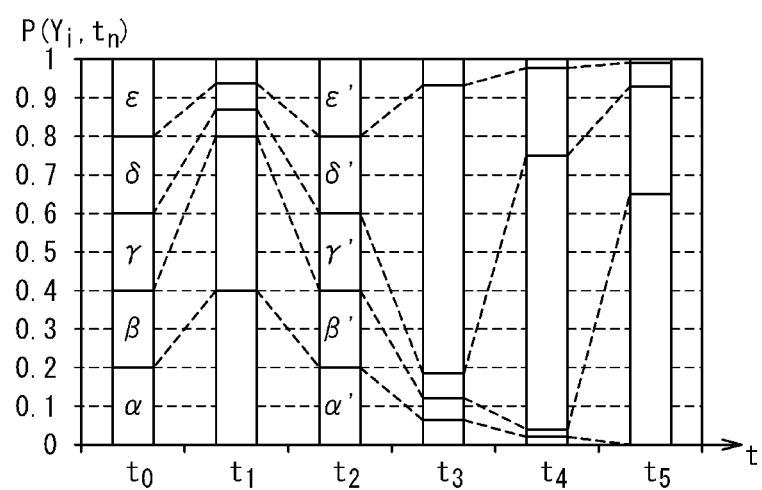
FIG. 11B is a graph showing the predicted course probability when using the corrected hypothesis routes 11B to 15B shown in FIG. 11A.

FIG. 11B is a graph showing the predicted course probability by using the corrected hypothesis routes 11B to 15B shown in FIG. 11A. The graph of FIG. 11B contains 6 band graphs like FIG. 7 of the first embodiment and FIG. 10C of the third embodiment. Also, the band graph of FIG. 11B respectively corresponds to the detection times $t_0$ to $t_5$ in order from the left. The band graphs corresponding to the detection start time $t_0$ and the detection time $t_1$ are divided into 5 areas α to ε, respectively. This division is the same as FIG. 7. However, the band graphs after the detection time $t_2$ are divided into 5 areas α'-ε'. These areas α'-ε' respectively correspond to the corrected hypothesis routes 11B to 15B.

Each of the 5 areas α'-ε' occupies ⅕ of the whole area at the detection time $t_2$ at which the correction of the hypothesis routes is carried out. This means that it is considered at the detection time $t_2$ that the probability that the target 2 moves along the hypothesis routes 11B to 15B are identical, like the case of the detection start time $t_0$ before the correction.

At the detection times $t_3$ to $t_5$, corresponding detection positions 33 to 35 approach the corrected hypothesis routes 14B, 13B and 12B. The distribution of areas α' to ε' at the detection times $t_3$ to $t_5$ shows this.

Because the other configuration and operations of the target monitoring system according to the present embodiment are same as the case of the third embodiment, further detailed description is omitted.

Fifth Embodiment

In the present embodiment, to detect the position of the target 2 which moves in the monitoring region 1 more precisely, the monitoring server 100 makes and updates a detection plan and the sensors 200A and 200B execute this detection plan.

Figure 12A:
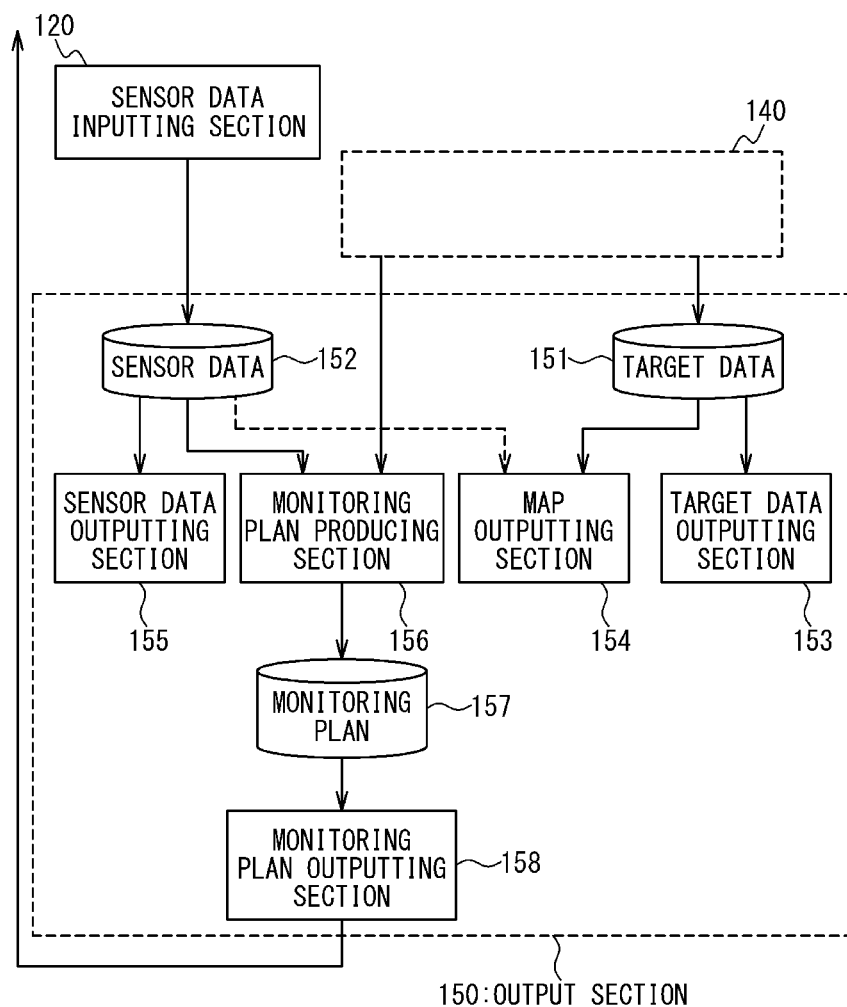
FIG. 12A is a second half of the functional block diagram showing an example of the overall configuration of the target monitoring system according to the embodiment.

FIG. 12A is a second half of the functional block diagram showing an example of the overall configuration of the target monitoring system according to the present embodiment. FIG. 12A is different from FIG. 2B of the first embodiment in the following points. That is, the output section 150 of the target monitoring system according to the present embodiment contains a monitoring plan producing section 156, a monitoring plan storing area 157 and a monitoring plan outputting section 158 in addition to the components of the target monitoring system according to the first embodiment. Because the other components of the target monitoring system according to the present embodiment are same as the case of the first embodiment shown in FIG. 2A and FIG. 2B, further detailed description is omitted.

The connection relation of the monitoring plan generating section, the monitoring plan storing section and the monitoring plan outputting section shown in FIG. 12A will be described. An output of the sensor data processing section 140 and an output of the sensor data storage area 152 are connected with an input of the monitoring plan producing section 156. An input of the monitoring plan storage area 157 is connected with an output of the monitoring plan producing section 156. An input of the monitoring plan outputting section 158 is connected with an output of the monitoring plan storage area 157. An output of the monitoring plan outputting section 158 is connected with the sensors 200A and 200B through the network 300.

Figure 12B:
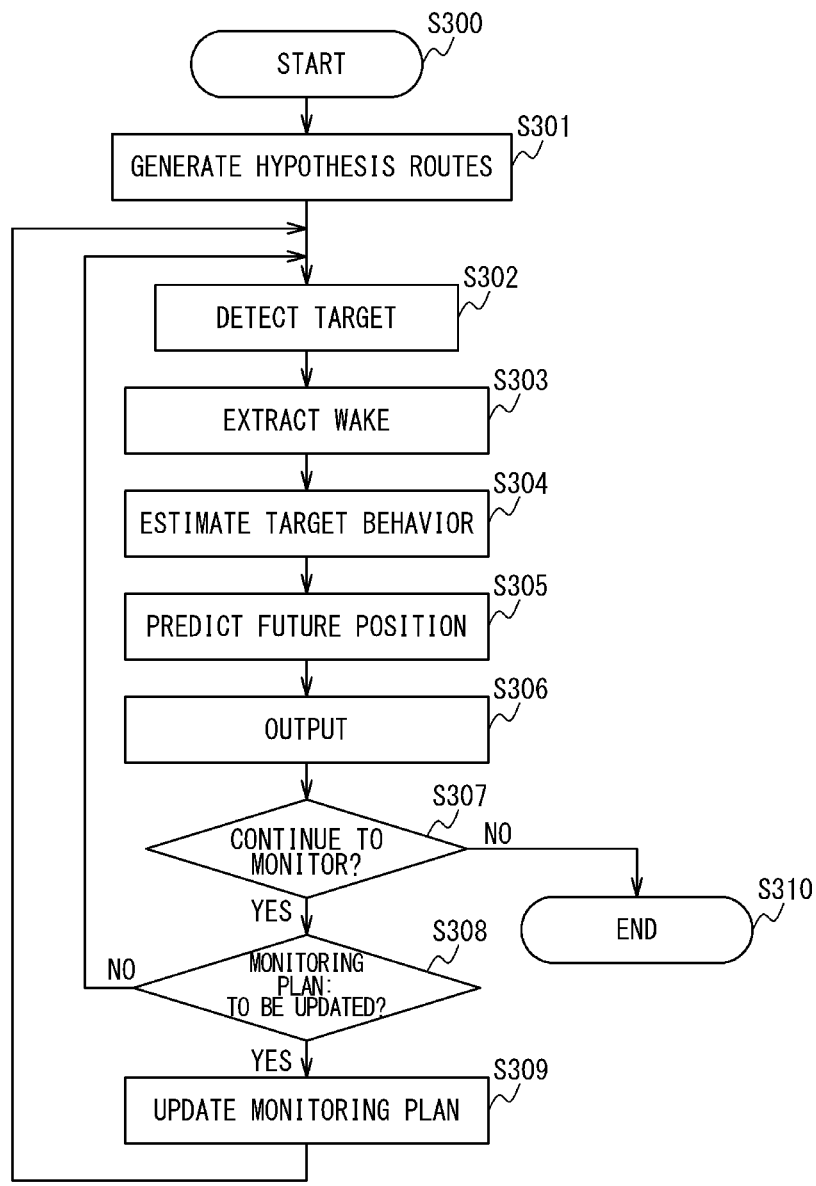
FIG. 12B is a flow chart showing an example of the overall operation of the target monitoring system according to the embodiment.

The operation of the target monitoring system according to the present embodiment, i.e. the target monitoring method according to the present embodiment will be described. FIG. 12B is a flow chart showing an example of the overall operation of the target monitoring system according to the present embodiment. The flow chart of FIG. 12B includes 11 steps S300 to S310. Because the steps S300 to S307 are same as the steps S100 to S107 in the first embodiment shown in FIG. 3, further detailed description is omitted.

When the monitoring is continued at the step S307 (YES), the step S308 is executed. Oppositely, when the monitoring is not continued (NO), the step S310 is executed.

Whether a monitoring plan is to be updated is determined at the step S308. This determination may be carried out manually by the user of the monitoring server 100 or automatically by the sensor data processing section 140. When updating (YES), the step S309 is executed. Oppositely, when not updating (NO), the step S302 is executed.

The updating of the monitoring plan is carried out at the step S309. The monitoring plan producing section 156 generates a new monitoring plan. The monitoring plan data showing the generated monitoring plan is stored in the monitoring plan storage area 157. The monitoring plan outputting section 158 transmits the stored monitoring plan data for the sensors 200A and 200B through the network 300. The sensors 200A and 200B receive and execute the transmitted monitoring plan data. Specifically, the time, the timing, and the frequency and the route and so on when the sensors 200A and 200B moves in the monitoring region 1 to detect the target 2 may be updated according to the new monitoring plan data. After the step S309, the step S302 is executed.

The operation of the target monitoring system according to the present embodiment ends at the step S310.

Because the other configuration and operation of the present embodiment are same as the case of the first embodiment, further detailed description will be omitted.

As such, the invention accomplished by the inventor has been specifically described based on the embodiments. However, the present invention is not limited to the embodiments and various modifications and changes are possible in a range not apart from the features. Also, the features described in the embodiments can be freely combined in the range with no technical contradiction.

What is claimed is:

1. A target monitoring system comprising:
  a database which stores a program, a physical model of a target, a non-physical model of the target and map data, wherein the physical model shows physical constraints of the target and the non-physical model shows a behavior pattern of the target:
  a display: and
  a controller which executes the program to perform:
  an existence probability distribution calculating function of calculating an existence probability distribution PD(tn) of the target at a time tn based on data received from an external sensor,
  a diffusion existence probability distribution calculating function of calculating a diffusion existence probability distribution PM(tn) of the target at the time tn based on an integration target distribution P(tn−i) of the target at a time tn−i previous to the time tn and the physical model of the target, a reliability calculating function of calculating a reliability po(tn) of the existence probability distribution PD(tn) based on at least one of a kind of the external sensor and environment around the external sensor, a calculation function of calculating the integration target distribution P(tn) of the target at the time tn based on the following equation (1)

$$P(tn)=po(tn){\times}PD(tn)+(1-po(tn)){\times}PM(tn) \qquad (1),$$

a calculating function calculating a wake of the target and a predicted course probability based on the integration target distribution P(tn−i), the integration target distribution P(tn) and the non-physical model of the target, and a control function of controlling the display to display a combination of the map data, the wake, and the predicted course probability of a position of the target, where n is an optional natural number equal to or more than 2.

2. The target monitoring system according to claim 1, wherein the controller executes the program to further perform a function of calculating the diffusion existence probability distribution $P_M(t_n)$ based on the non-physical model of the target in addition to the integration target distribution $P(t_{n-1})$ and the physical model.

3. The target monitoring system according to claim 2, wherein the existence probability distribution $P_D(t_n)$ is a distribution in which an existence probability decreases according to a distance from a detection position of the target calculated based on the data received from the external sensor.

4. The target monitoring system according to claim 3, wherein the diffusion existence probability distribution $P_M(t_n)$ is a distribution of a non-point symmetry with respect to a center of the existence probability distribution $P_D(t_n)$.

5. The target monitoring system according to claim 2, wherein the controller further executes the program to perform:

a hypothesis route calculating function of calculating a plurality of hypothesis routes of the target based on the physical model, the non-physical model and the detection position of the target at the plurality of times before the time $t_n$, and a control function of controlling the display to display the plurality of hypothesis routes together with the wake and the predicted course probability.

6. The target monitoring system according to claim 2, wherein the controller further executes the program to perform:

a hypothesis route calculating function of calculating a plurality of hypothesis routes of the target based on the physical model, the non-physical model and the detection position of the target at the plurality of times before the time $t_n$, and a calculating function of calculating the diffusion existence probability distribution $P_M(t_n)$ based on the plurality of hypothesis routes.

7. The target monitoring system according to claim 1, wherein the controller further executes the program to perform:

a calculating function of calculating a corrected integration target distribution $P_C(t_n)$ by correcting the integration target distribution $P(t_n)$ based on the reliability $p_0(t_{n+1})$ of the existence probability distribution $P_D(t_n)$ corrected at a time $t_{n+1}$ after to the time $t_n$, a correcting function of correcting the wake based on the corrected integration target distribution $P_C(t_n)$, and a control function of controlling the display to display the corrected wake.

8. The target monitoring system according to claim 7, wherein the controller executes the program to perform:

the existence probability distribution calculating function of calculating the existence probability distribution $P_D(t_{n+1})$, the reliability calculating function to calculate the reliability $p_0(t_{n+1})$ by executing the reliability calculation processing, the function of calculating the corrected integration target distribution $P_C(t_n)$ by correcting the integration target distribution $P(t_n)$ based on the reliability $p_0(t_n)$, the diffusion existence probability distribution calculating function of calculating the diffusion existence probability distribution $P_M(t_{n+1})$ of the target at the time $t_{n+1}$ based on the corrected integration target distribution $P_C(t_n)$ and the physical model of the target, the calculating function of calculating the integration target distribution $P(t_{n+1})$ of the target at the time $t_{n+1}$ based on the following equation (2):

$$P(t_{n+1})=p_0(t_{n+1}){\times}P_D(t_{n+1})+(1-p_0(t_{n+1})){\times}P_M(t_{n+1}) \qquad (2)$$

the correcting function of correcting the wake and updating the predicted course probability, based on the corrected integration target distribution $P_C(t_n)$ and the integration target distribution $P(t_{n+1})$, and the control function of controlling the display unit displays to display a combination of the map data, the corrected wake and the updated predicted course probability.

9. The target monitoring system according to claim 7, further comprising a second external sensor different from the external sensor as a first external sensor, wherein the processing unit controller executes the program to accomplish the existence probability distribution calculation processing calculating function of calculating the existence probability distribution $P_D(t_{n+1})$ of the target at the time $t_{n+1}$ based on data received from the second external sensor.

10. A target monitoring method performed by a target monitoring system, the target monitoring system including a database which stores a program, a physical model of a target a non-physical model of the target and map data; a display; and a controller which executes the program, the target monitoring method comprising:

detecting a target by an external sensor;

calculating, by the controller, an existence probability distribution PD(tn) of the target at a time tn based on data received from an external sensor, when n is an optional natural number equal to or more than 2;

calculating, by the controller, a diffusion existence probability distribution PM(tn) of the target at the time tn based on an integration target distribution P(tn−i) of the target at a time tn−i previous to the time tn and the physical model showing physical constraints of the target;

calculating, by the controller, a reliability po(tn) of the existence probability distribution PD(tn) based on at least one of a kind of the external sensor and environment around the external sensor;

calculating, by the controller, the integration target distribution P(tn) of the target at the time tn based on the following equation (1):

$$P(tn) = po(tn) \times PD(tn) + (I - po(tn)) \times PM(tn) \quad (1);$$

Calculating, by the controller, a wake of the target and a predicted course probability based on the integration target distribution P(tn−i), the integration target distribution P(tn) and the non-physical model of the target; and displaying, by the display, a combination of the map data, the wake and the predicted course probability of a position of the target, wherein the physical model shows physical constraints of the target, and the nonphysical model shows a behavior pattern of the target.

11. The target monitoring method according to the claim 10, further comprising:

calculating, by the controller, the diffusion existence probability distribution $P_M(t_{n+1})$ of the target at a time $t_{n+1}$ after the time $t_n$ based on the integration target distribution $P(t_n)$ and the predicted course probability;

specifying, by the controller, an area having a high existence probability of the target based on the diffusion existence probability distribution $P_M(t_{n+1})$;

detecting, by the controller, the area having the high existence probability of the target by using the external sensor or a second external sensor different from the external sensor; and calculating, by the controller, the wake and the predicted course probability of the target based on the integration target distribution $P(t_n)$, wherein the displaying on the display comprises:

displaying a combination of the map data, the wake and the predicted course probability on the display.

* * * * *